United States Patent
Dhanuka et al.

(10) Patent No.: US 11,847,159 B2
(45) Date of Patent: *Dec. 19, 2023

(54) DETECTING TYPOGRAPHY ELEMENTS FROM OUTLINES

(71) Applicant: Adobe Inc., San Jose, CA (US)

(72) Inventors: Praveen Kumar Dhanuka, Howrah (IN); Matthew Fisher, San Francisco, CA (US); Arushi Jain, Delhi (IN)

(73) Assignee: Adobe Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/812,341

(22) Filed: Jul. 13, 2022

(65) Prior Publication Data

US 2022/0351489 A1    Nov. 3, 2022

Related U.S. Application Data

(63) Continuation of application No. 16/675,529, filed on Nov. 6, 2019, now Pat. No. 11,393,187.

(51) Int. Cl.
| | |
|---|---|
| *G06F 16/56* | (2019.01) |
| *G06V 30/182* | (2022.01) |
| *G06F 16/901* | (2019.01) |
| *G06V 30/262* | (2022.01) |
| *G06V 30/10* | (2022.01) |
| *G06V 30/19* | (2022.01) |

(52) U.S. Cl.
CPC .......... *G06F 16/56* (2019.01); *G06F 16/9014* (2019.01); *G06V 30/1823* (2022.01); *G06V 30/262* (2022.01); *G06V 30/10* (2022.01); *G06V 30/19027* (2022.01)

(58) Field of Classification Search
None
See application file for complete search history.

(56) References Cited

U.S. PATENT DOCUMENTS

| | | | |
|---|---|---|---|
| 11,393,187 B2* | 7/2022 | Dhanuka | G06F 16/56 |
| 2015/0325022 A1* | 11/2015 | Betz | G06T 11/203 |
| | | | 345/467 |
| 2017/0098138 A1 | 4/2017 | Wang et al. | |

(Continued)

OTHER PUBLICATIONS

Lee, J.—"Squiggle—A Glyph Recognizer for Gesture Input"—arXiv 2011, pp. 1-11 (Year: 2011).*

(Continued)

*Primary Examiner* — Bernard Krasnic
(74) *Attorney, Agent, or Firm* — Keller Preece PLLC

(57) ABSTRACT

Systems, methods, and non-transitory computer-readable media are disclosed for determining a glyph and a font from a vector outline by applying various combinations of hash-based querying, path-descriptor matching, or anchor-point matching. For example, the disclosed systems can select a subset of candidate glyphs for a vector outline based on (i) comparing hash keys of candidate glyphs with a point-order-agnostic hash key corresponding to the vector outline and (ii) comparing a path descriptor for a primary path of the vector outline to path descriptors corresponding to candidate glyphs. By further comparing anchor points between the vector outline and the subset of candidate glyphs, the disclosed systems can select both a glyph and a font matching the vector outline.

20 Claims, 12 Drawing Sheets

(56) References Cited

U.S. PATENT DOCUMENTS

2017/0098140 A1    4/2017   Wang et al.
2017/0098141 A1    4/2017   Wang et al.
2017/0255764 A1    9/2017   Lv
2018/0253878 A1    9/2018   Jain
2021/0118207 A1    4/2021   Kumawat et al.

OTHER PUBLICATIONS

Zhangyang Wang et al.; "DeepFont: Identify Your Font from An Image"; Jul. 12, 2015; Cornell University; arXiv:1507.03196v1.
"Procrustes analysis"; Wikipedia.org; Date Downloaded Nov. 14, 2019; https://en.wikipedia.org/wiki/Procrustes_analysis.
David Cohen-Steiner et al. "Variational Shape Approximation"; http://www.80bola.com.geometry.caltech.edu/pubs/CAD04.pdf; Proceeding SIGGRAPH '04 ACM SIGGRAPH 2004 Papers pp. 905-914; Journal ACM Transactions on Graphics (TOG) TOG Homepage vol. 23 Issue 3, Aug. 2004.
"Hierarchical clustering"; Wikipedia.org; Date Downloaded Nov. 14, 2019; https://en.wikipedia.org/wiki/Hierarchical_clustering.
Suveeranont, R.—"Example-Based Automatic Font Generation"—Springer-Verlag Berlin Heidelberg 2010, pp. 127-138 (Year: 2010).
U.S. Appl. No. 16/675,529, Feb. 2, 2022, Preinterview 1st Office Action.
U.S. Appl. No. 16/675,529, Mar. 17, 2022, Notice of Allowance.

\* cited by examiner

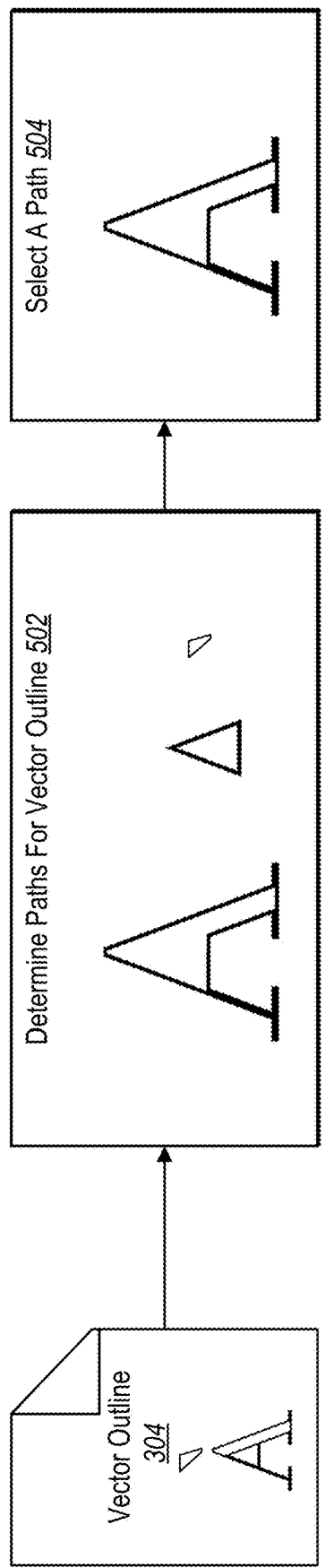
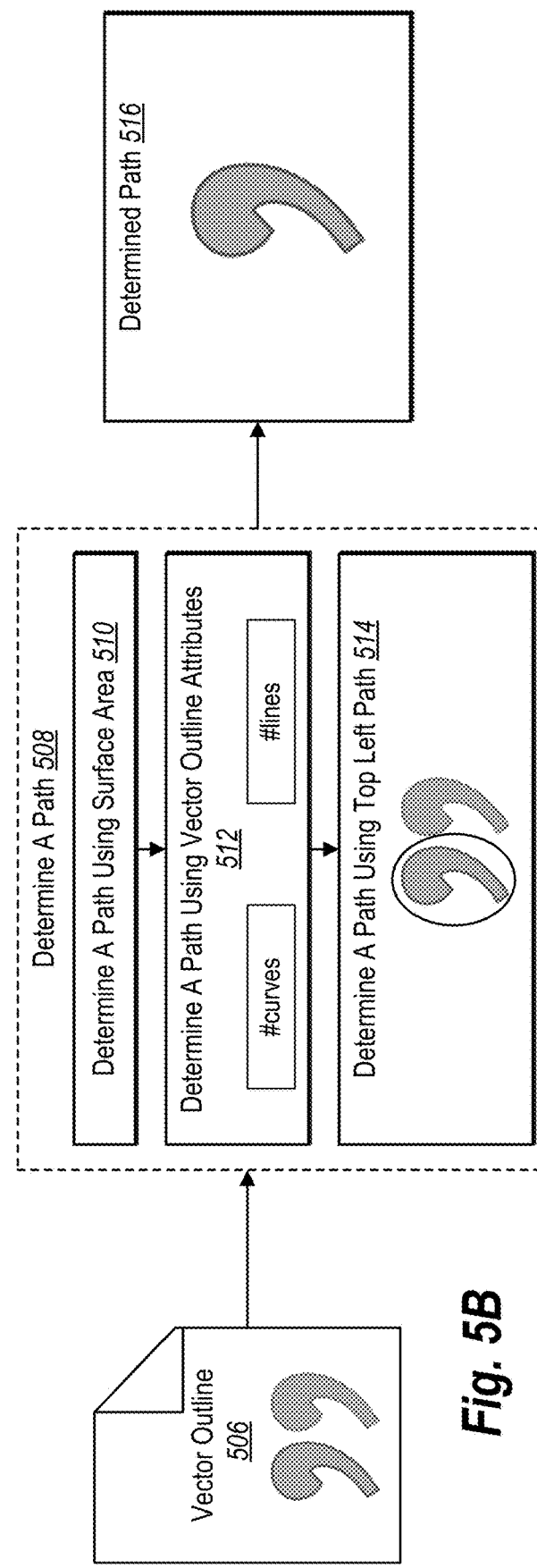
Fig. 5A
Fig. 5B glyphs N
<hash><GID><font ID><descriptor>
<hash><GID><font ID><descriptor>
<hash><GID><font ID><descriptor>
⋮
<hash><GID><font ID><descriptor>
<hash><GID><font ID><descriptor>
<hash><GID><font ID><descriptor>
<hash><GID><font ID><descriptor>
*Fig. 8A*
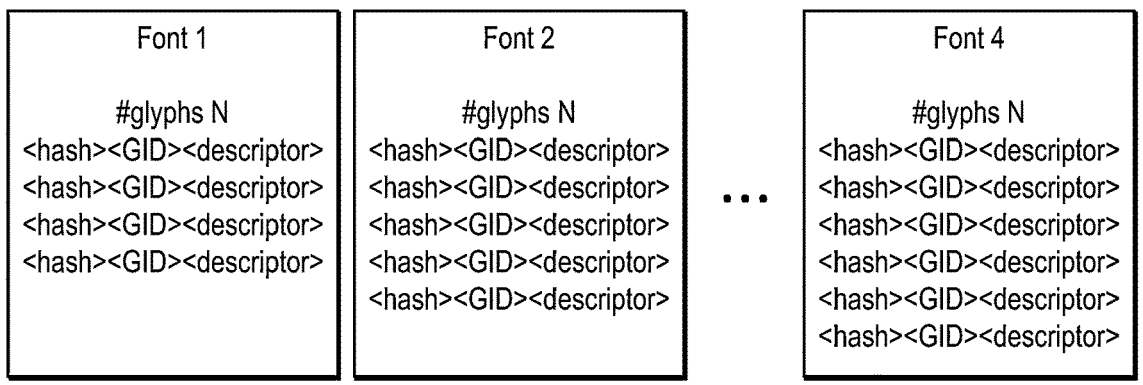
*Fig. 8B*
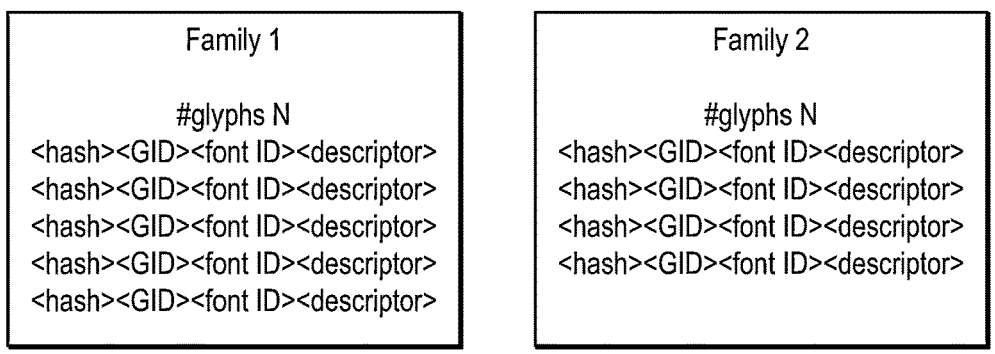
*Fig. 8C*

DETECTING TYPOGRAPHY ELEMENTS FROM OUTLINES

CROSS-REFERENCE TO RELATED APPLICATIONS

The present application is a continuation of U.S. application Ser. No. 16/675,529, filed on Nov. 6, 2019. The aforementioned application is hereby incorporated by reference in its entirety.

BACKGROUND

In recent years, individuals and organizations have increasingly used typography systems in computing devices to view and modify typography elements for characters (e.g., letters, numbers). Indeed, some existing typography systems can create, store, and use a large quantity of graphical typography elements, such as fonts and glyphs for characters. Such graphical typography elements are often portrayed within digital files (e.g., SVG, EPS, JPEG, and/or PDF files) without corresponding information for the typography elements, such as identifying glyph or font information. For instance, conventional typography systems can convert digital files to include vector outlines representing graphical typography elements to maintain the characteristics across different computing devices, file types, display mediums, and/or digital file reading applications.

SUMMARY

This disclosure describes one or more embodiments of systems, computer-readable media, and methods that solve the foregoing problems and provide other benefits. In some cases, the disclosed systems determine a glyph and a font for a vector outline of a character by applying various combinations of hash-based querying, path-descriptor matching, or anchor-point matching to candidate glyphs. By comparing candidate glyphs to such a vector outline using either or both of point-order-agnostic comparisons and path-order-agnostic comparisons, the disclosed systems can accurately and efficiently detect typography elements from the vector outline. For example, the disclosed systems can identify a subset of candidate glyphs and fonts for a vector outline based on (i) comparing hash keys of candidate glyphs with a point-order-agnostic hash key corresponding to the vector outline and (ii) comparing a path descriptor for a primary path of the vector outline to path descriptors corresponding to candidate glyphs. By further comparing anchor points between the vector outline and the subset of candidate glyphs, the disclosed systems can select both a glyph and a font matching the vector outline. In some embodiments, the disclosed systems can also identify affine transformations between a vector outline and candidate glyphs by applying either or both of path-descriptor matching and anchor-point matching to the candidate glyphs. The disclosed systems can accordingly detect glyph and font information from a vector outline with accuracy and efficient-memory usage—without relying on point-order comparisons or path-order comparisons.

BRIEF DESCRIPTION OF THE DRAWINGS

The detailed description is described with reference to the accompanying drawings described below.

FIGS. 5A-5C illustrate schematic diagrams of a digital typography detection system determining a path and determining a path descriptor for a vector outline in accordance with one or more embodiments.

FIGS. 8A-8C illustrate glyph databases of a digital typography detection system in accordance with one or more embodiments.

DETAILED DESCRIPTION

Figure 1:
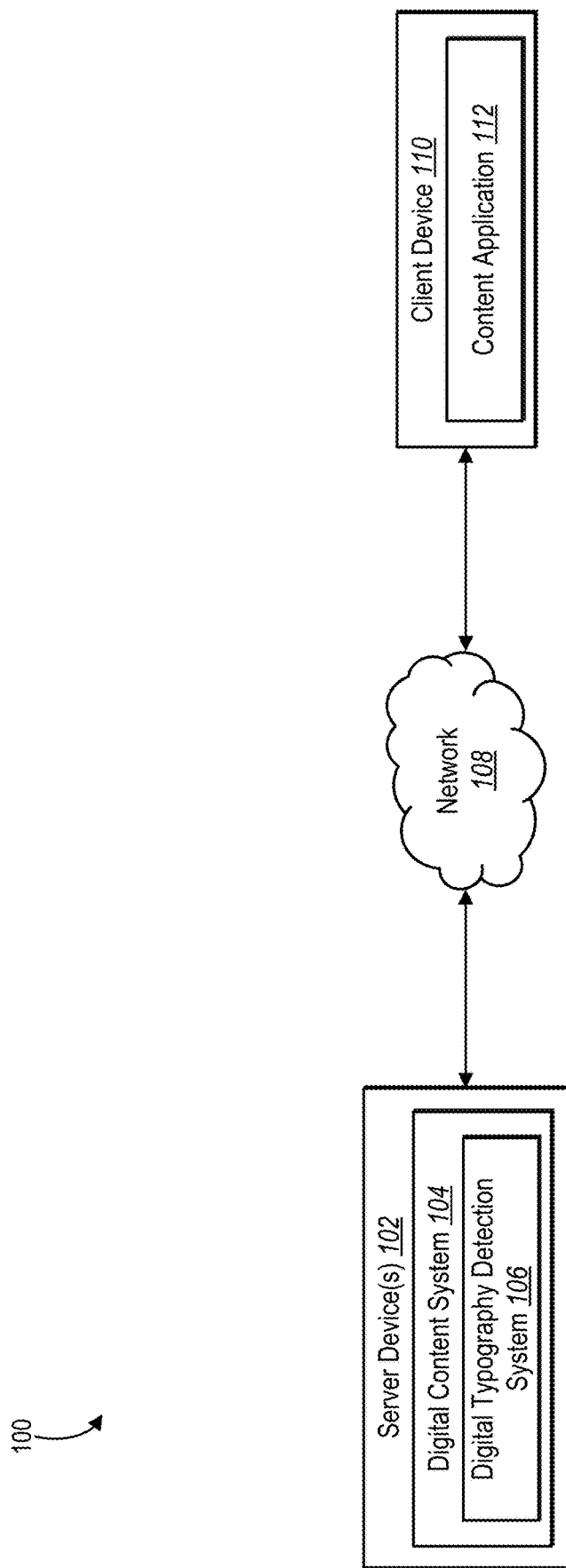
FIG. 1 illustrates a schematic diagram of an example system in which a digital typography detection system can operate in accordance with one or more embodiments.

This disclosure describes one or more embodiments of a digital typography detection system that can accurately and efficiently detect typography elements from a vector outline while performing one or both of point-order-agnostic comparisons and path-order-agnostic comparisons between the vector outline and candidate glyphs. For instance, the digital typography detection system can identify a vector outline for a character in a digital file and generate a point-order-agnostic hash key for the vector outline. Based on the point-order-agnostic hash key, the digital typography detection system can select a set of candidate glyphs and fonts (with matching hash keys) for the vector outline. The digital typography detection system can further determine a path descriptor for a primary path of the vector outline. Based on the path descriptor, the digital typography detection system can select a subset of candidate glyphs with matching path descriptors from the set of candidate glyphs. From among the subset of candidate glyphs, the digital typography detection system can determine a glyph and a font for the vector outline by comparing anchor points of the vector outline to anchor points of the subset of candidate glyphs. In some embodiments, the digital typography detection system can also identify affine transformations between a vector outline and candidate glyphs by applying either or both of path-descriptor matching and anchor-point matching to the candidate glyphs.

As just mentioned, the digital typography detection system can generate a point-order-agnostic hash key for a vector outline and use the hash key to select a set of candidate glyphs for the vector outline. In some embodiments, for example, the digital typography detection system generates a point-order-agnostic hash key by concatenating at least one of a number of lines, a number of paths, or a number of curves corresponding to the vector outline. After generating such a point-order-agnostic hash key, the digital typography detection system can compare the hash key to one or more hash keys corresponding to glyphs in a glyph database. By using the hash key to search for candidate glyphs in the glyph database, the typography detection system can identify a set of candidate glyphs for the vector outline with increased efficiency in memory or without having to install fonts on a user device or compare the ordering of anchor points between the vector outline and candidate glyphs.

In addition to generating a point-order-agnostic hash key, the digital typography detection system can determine a path descriptor for a path from a vector outline. For instance, the digital typography detection system can determine a single path (e.g., a primary path) for the vector outline after ordering one or more paths of the vector outline using a variety of features, such as surface area, attributes of the vector outline, and/or a position of the path. The digital typography detection system can subsequently determine a path descriptor for the single path by selecting a threshold number of equally spaced anchor points from the anchor points of the single path. By identifying a single path for the vector outline, the digital typography detection system can utilize a path descriptor to search for candidate glyphs without comparing the order of paths between the vector outline and candidate glyphs.

Based on the path descriptor, the digital typography detection system can select a subset of candidate glyphs for the vector outline. For instance, the digital typography detection system can compare the path descriptor to path descriptors corresponding to paths from the previously selected set of candidate glyphs. In particular, the digital typography detection system can select the subset of candidate glyphs by determining which of the path descriptors corresponding to the set of candidate glyphs constitute affine transformations of the path descriptor for the vector outline. The digital typography detection system can also determine possible transformations of the vector outline while selecting the subset of candidate glyphs. By comparing path descriptors between the vector outline and the set of candidate glyphs—and not comparing a complete set of anchor points at this stage—the digital typography detection system can efficiently and quickly identify the subset of candidate glyphs.

From among the subset of candidate glyphs, the digital typography detection system can determine a glyph and font that corresponds to the vector outline based on the set of anchor points for the vector outline and sets of anchor points corresponding to the subset of candidate glyphs. For example, the digital typography detection system can compare the full set of anchor points corresponding to the vector outline to the sets of anchor points corresponding to the subset of candidate glyphs using an affine-transformation analysis. By comparing the full set of anchor points between the vector outline and the subset of candidate glyphs, the digital typography detection system efficiently utilizes computational resources while also determining a candidate glyph that matches the vector outline. As described below, the digital typography detection system can also initially perform anchor-point matching on a group of candidate glyphs from the subset of candidate glyphs corresponding to a specific font to facilitate detecting typography elements for a vector outline.

As suggested above, individuals and businesses sometimes attempt to explore or modify typography elements within digital files (e.g., SVG, EPS, JPEG, PDF) and/or utilize these typography elements within other digital content. But when such files do not include typography element information, conventional typography systems sometimes attempt to identify (or recognize) information corresponding to the typography elements. Although conventional typography systems can sometimes recognize glyphs, fonts, and/or other typography elements—if given identifying data within the file—such systems also have a number of significant shortcomings, particularly in regard to accurately, efficiently, and flexibly determining such typography elements from digital files including a vector outline of a character.

For instance, some conventional typography systems utilize optical character recognition (OCR) to recognize characters in digital content. Although conventional-OCR-based systems can recognize characters, such systems often fail to accurately detect glyph types and other typography elements (such as transformations) from vector outlines. By contrast, some conventional typography systems utilize deep-font recognition to recognize fonts. But such conventional systems fail to accurately detect fonts, glyphs, and/or transformations when the vector outline (or other content) (i) is transformed away from a trained position or (ii) corresponds to untrained typography elements. Indeed, most conventional typography systems cannot accurately recognize a combination of glyphs, fonts, and transformations for input vector outlines or other content.

In addition to sometimes inaccurately identifying typography elements, conventional typography systems often inefficiently recognize typography elements. In particular, many conventional typography systems utilize memory inefficiently while detecting typography elements from input vector outlines or other input content. For instance, some conventional typography systems store a large number of fonts on memory to facilitate identifying typography elements (e.g., by utilizing one gigabyte of memory for 6,500 fonts). Further, some conventional typography systems utilize computing resources inefficiently. For example, conventional typography systems often utilize an increased amount of computational resources to process the excessive amount of data for fonts to determine a matching typography element for input vector outlines or other content. By inefficiently using memory and/or computational resources, conventional typography systems slowly detect typography elements (e.g., by consuming additional time to process the large amount of data for fonts). Moreover, many conventional typography systems require training for accuracy which utilizes additional computational resources.

In addition to computing inefficiencies, many conventional typography systems rigidly require characters to be input in a particular format (or correspond to saved data) to recognize typography elements. For example, conventional typography systems often require a specific order for points and/or paths of input vector outlines to accurately detect typography elements. Accordingly, many conventional typography systems cannot detect typography elements for input vector outlines inconsistent with a specific ordering of points or paths. Nor can some conventional typography systems recognize font or glyph from a vector outline with a released compound path—that is, where a digital file indicates no associate between paths corresponding to a same character. In addition to rigid formatting requirements, many conventional typography systems detect typography elements by referring to installed fonts on a user device. Accordingly, such conventional typography systems can only detect typography elements for fonts installed on a user device.

By contrast, the digital typography detection system more accurately, efficiently, and easily detects typography elements from a vector outline than conventional typography systems. For instance, the digital typography detection system can accurately detect a variety of typography elements including some (or all) of fonts, glyphs, and transformations from a vector outline. By applying various combinations of hash-based querying, path-descriptor matching, or anchor-point matching to candidate glyphs, the typography detection system can accurately detect a glyph and font for a vector outline without data for point or path order from the vector outline. The digital typography detection system can also accurately detect glyphs and fonts without training and regardless of transformation. Indeed, in some embodiments, the digital typography detection system detects glyphs and fonts from vector outlines with a 99.4% accuracy without a training phase.

In addition (or in the alternative) to improved accuracy, the digital typography detection system can more efficiently utilize computing resources to detect typography elements from vector outlines than conventional typography systems. For example, by utilizing hash-based querying and hash keys, the digital typography detection system can reduce the amount of memory to detect typography elements and efficiently organize a cache (e.g., by utilizing 200 megabytes or less for 7,000 fonts). By reducing memory and utilizing path descriptors, the digital typography detection system can also more quickly and efficiently utilize computational resources to detect typography elements. For instance, the digital typography detection system can process less data than conventional systems by using less memory, lowering computational costs, and avoiding training to match path descriptors (rather than each anchor point), select candidate glyphs, and detect a final glyph and font for a vector outline. The digital typography detection system can also more quickly detect typography elements by processing less data and performing faster affine-transformation analyses than conventional systems to detect differences between path descriptors.

In addition to improved efficiency, the digital typography detection system can also detect typography elements from vector outlines with more flexibility than conventional typography systems. By performing point-order agnostic or path-order agnostic comparisons between vector outlines and candidate glyphs, the digital typography detection system can accurately detect typography elements from a variety of vector outlines and corresponding digital files. By utilizing a compact glyph database with hash keys, using less memory, and determining path descriptors reduced in size for matching glyphs with vector outlines, the digital typography detection system can operate on a user device without having to install fonts on the user device. In particular, the digital typography detection system can detect glyphs and fonts corresponding to a font not installed on the user device. The digital typography detection system, therefore, can detect a greater variety of glyphs and fonts without being limited to only typography elements of installed fonts (e.g., including Chinese/Japanese/Korean fonts). The digital typography detection system can also detect typography elements within vector outlines that include released compound paths (e.g., due to document flattening)—by detecting a glyph, a font, and/or transformation for a vector outline in a digital file without information associating paths corresponding to a same character.

As illustrated by the foregoing discussion, the present disclosure utilizes a variety of terms to describe features and advantages of the digital typography detection system. For instance, as used herein, the term "vector outline" (sometimes referred to as outline or vector format) refers to a vector-based representation of one or more characters. In particular, a vector outline can refer to a vector-based representation of one or more paths described in terms of a collection of closed Bezier splines (or curves). A vector outline can include a set of anchor points connected via lines and/or curves (e.g., Bezier splines or curves) to form one or more paths representing one or more glyphs and/or characters (e.g., any variety of printed and/or written letters, numbers, and/or symbols). In some embodiments, an image, PDF, SVG, and/or EPS file can include a vector outline (e.g., a vector outline in Bezier form).

Furthermore, as used herein, the term "typography element" (sometimes referred to as "typography information") refers to information corresponding to the style and/or appearance of one or more characters. For instance, a typography element can include glyph, font, and/or transformation information. Additionally, as used herein, the term "glyph" refers to a pictorial representation of a character using one or more specific shapes. A glyph can accordingly include a specific shape, design, or representation of a character. Furthermore, as used herein, the term "font" refers to a set of particular styles of a typeface for a collection of characters. A font can include a combination of a typeface and other stylistic qualities for a collection of characters, such as pitch, spacing, and size. Indeed, various types of glyphs (within a single font type) can represent a specific character. To provide but one example, a font can include Myriad Pro Regular and a glyph can include, but is not limited to, accented glyphs, Latin glyphs, or Greek glyphs for the font Myriad Pro Regular. In addition, as used herein, the term "character" refers to a single textual or written element, such as a letter, numeral, or mark of punctuation.

Moreover, as used herein "transformation information" refers to one or more rules that affect the appearance of a graphical object (e.g., a glyph). For instance, transformation information can include, but is not limited to, a translation value, a scaling value, a rotation value, a shearing value, and/or any combination thereof. Additionally, as used herein, the term "transformation matrix" refers to an array that includes one or more values for one or more types of transformation information to represent the transformation of a graphical object. Furthermore, as used herein, the term "affine transformation" refers to a transformation between graphical objects (e.g., a glyph) that preserves collinearity and ratios of distances for one or more line and/or curve segments. Indeed, an affine-transformation analysis can include a determination of a transformation between graphical objects to determine whether a path and/or a vector outline matches another path and/or vector outline by determining whether the paths and/or vector outlines are affine transformations of each other. The digital typography detection system utilizes an affine-transformation analysis as described below (e.g., in relation to FIGS. 6 and 7).

Additionally, as used herein, the term "point-order-agnostic hash key" (sometimes referred to as a hash key or a hash value) refers to a code, alphanumeric, or value (e.g., a numerical value) identifying a glyph based on one or more specific attributes (e.g., lines, paths, curves, or anchor points). For example, a hash key can include a concatenated numerical value formed from concatenating a number of lines, a number of paths, a number of curves, a summation of lines and curves, and/or any combination thereof. As an example, the digital typography detection system can generate a hash key of "0100050000" (e.g., a 5 byte representation of a concatenation of number of paths, lines, and curves) for a glyph that contains one path, five lines, and zero curves. By using quantity based values of one or more attributes of a glyph, the digital typography detection system can generate hash keys that act as identification tools for glyphs while remaining point order agnostic.

Moreover, as used herein, the term "glyph database" refers to a structured set of data that contains one or more glyphs and one or more hash keys corresponding to the glyphs (e.g., a text and/or cache file with organized data, a SQL table, a digital spreadsheet, etc.). In particular, a glyph database can include a searchable, structured set of data that creates a relationship between one or more hash keys, one or more glyphs, one or more fonts, one or more path descriptors, one or more glyph vector outlines, and/or any combination thereof. For example, a glyph database can be organized as described below in relation to FIGS. 8A-8C.

Additionally, as used herein, the term "line" (sometimes referred to as "vector line") refers to a geometrical object that connects two anchor points within a vector outline without forming a curve. Furthermore, as used herein, the term "curve" (sometimes referred to as "vector curve") refers to a geometrical object that connects two anchor points within a vector outline to represent (or form) a deviation from a straight line between the two anchor points. Moreover, as used herein, the term "anchor point" refers to an object that marks the end of a line segment and/or a curve segment within a vector outline (e.g., Bezier control points). In addition, as used herein, the term "path" (sometimes referred to as a closed path) refers to an enclosed area formed by lines, curves, anchor points, and/or any combination thereof. Indeed, a path can include a geometrical object that is portrayed by a connection of one or more lines and/or one or more curves using one or more anchor points.

Moreover, as used herein, the term "path descriptor" refers to a descriptive representation (e.g., metadata) for a vector outline based on a subset of anchor points for a path of the vector outline. In particular, a path descriptor can include a subset of anchor points (and positions of the anchor points respective to each other) from a single path of a vector outline (e.g., a primary path of the vector outline). Indeed, the path descriptor can include a threshold number of equally spaced anchor points (or Bezier control points) that correspond to a single path of a vector outline. A path descriptor can be a concise representation for a vector outline identifying a glyph and having fewer anchor points than a full set of anchor points for the entire vector outline.

Turning now to the figures, FIG. 1 illustrates a schematic diagram of a system 100 in which a digital typography detection system 106 can operate in accordance with one or more embodiments. As illustrated in FIG. 1, the system 100 includes server device(s) 102, a network 108, and a client device 110. As further illustrated in FIG. 1, the one or more components of the system 100 can communicate with each other (e.g., via network 108 and/or directly).

As illustrated in FIG. 1, the server device(s) 102 can include a variety of types of computing devices, including those explained below with reference to FIG. 11. The server device(s) 102 can include a digital content system 104 which further includes the digital typography detection system 106. The digital typography detection system 106 can store, query, process, modify, receive, utilize, manage, and/or provide (to a client device) typography elements, digital files (e.g., digital files that include vector outlines), and/or one or more glyph databases with hash keys (generated in accordance with one or more embodiments herein). Furthermore, the digital typography detection system 106 can also include a repository having a variety of fonts, font families, glyphs, vector outlines, and/or path descriptors.

Additionally, the digital typography detection system 106 can also detect typography elements (e.g., fonts, glyphs, transformations) from a vector outline. For instance, the digital typography detection system 106 can detect a glyph, font, and/or a transformation for a vector outline using one or more of hash-based querying, path-descriptor matching, or anchor-point matching in accordance with one or more embodiments herein. In some embodiments, the digital typography detection system 106 can receive (e.g., at the server device(s) 102 from the client device 110) a request to detect a typography element from a vector outline and can provide a detected typography element to the client device 110 (e.g., as a cloud-based service).

Furthermore, as shown in FIG. 1, the system 100 can include the client device 110. Indeed, the client device 110 can modify, create, receive, and/or send a digital file that includes one or more vector outlines. For instance, in one or more embodiments, the client device 110 can provide a digital file that includes a vector outline to the digital typography detection system 106 and request typography elements for the vector outline. Indeed, the digital typography detection system 106 can detect typography elements in accordance with one or more embodiments herein and provide the typography element information (e.g., a glyph type, a font type, a transformation) to the client device 110. Additionally, the client device 110, as illustrated in FIG. 1, can include a variety of types of computing devices, including those explained below with reference to FIG. 11.

Furthermore, the client device 110 can include a content application 112. For example, the content application 112 can provide tools, graphical user interfaces, and/or options to modify, create, receive, and/or send a digital file that includes one or more vector outlines. For example, the content application 112 can be a software application (e.g., that implements the digital typography detection system 106) installed on the client device 110 or a software application hosted on the server device(s) 102. For instance, when hosted on the server device(s) 102, the content application 112 can be accessed by the client device 110 through a web browser.

Although FIG. 1 illustrates the digital typography detection system 106 implemented on the server device(s) 102, the digital typography detection system 106 can be implemented on the client device 110. In particular, the digital typography detection system 106 can operate on the client device 110 and detect a glyph, font, and/or a transformation for a vector outline using one or more of hash-based querying, path-descriptor matching, or anchor-point matching directly on the client device. For example, the client device 110 can include the digital typography detection system 106 via the content application 112. Indeed, as discussed above, the digital typography detection system 106 can efficiently and flexibly detect typography elements from a vector outline with less memory usage, less computational resources, and without installing fonts. Accordingly, the digital typography detection system 106 can operate on client devices with limited computational resources. Indeed, in some embodiments, the digital typography detection system 106 can operate on the client device 110 in an offline mode (e.g., without having to communicate with the server device(s) 102).

Additionally, as shown in FIG. 1, the system 100 includes the network 108. As mentioned above, the network 108 can enable communication between components of the system 100. In one or more embodiments, the network 108 may include a suitable network and may communicate using any communication platforms and technologies suitable for transporting data and/or communication signals, examples of which are described with reference to FIG. 11. Furthermore, although FIG. 1 illustrates the server device(s) 102 and the client device 110 communicating via the network 108, the various components of the system 100 can communicate and/or interact via other methods (e.g., the server device(s) 102 and the client device 110 can communicate directly).

In addition, as previously mentioned, although FIG. 1 illustrates the digital typography detection system 106 being implemented by a particular component and/or device (e.g., server device(s) 102) within the system 100, the digital typography detection system 106 (and/or the digital content system 104) can be implemented, in whole or in part, by other computing devices and/or components in the system 100. For example, as mentioned above, the digital typography detection system 106 (and/or the digital content system 104) can be implemented in whole, or in part, by the client device 110.

As an example, in one or more embodiments, the client device 110 (via the content application 112) can identify a vector outline that does not have corresponding typography information. Indeed, the digital typography detection system 106 (e.g., on the server device(s) 102 and/or on the client device 110) can detect typography elements from the vector outline in accordance with one or more embodiments herein and provide (or display) the typography elements to the client device 110. Moreover, the client device 110 can further utilize the detected typography elements to make the vector outline modifiable, display the typography elements as information for the vector outline, extract (or utilize) the detected typography elements on another graphical object (e.g., within a different digital file).

Figure 2:
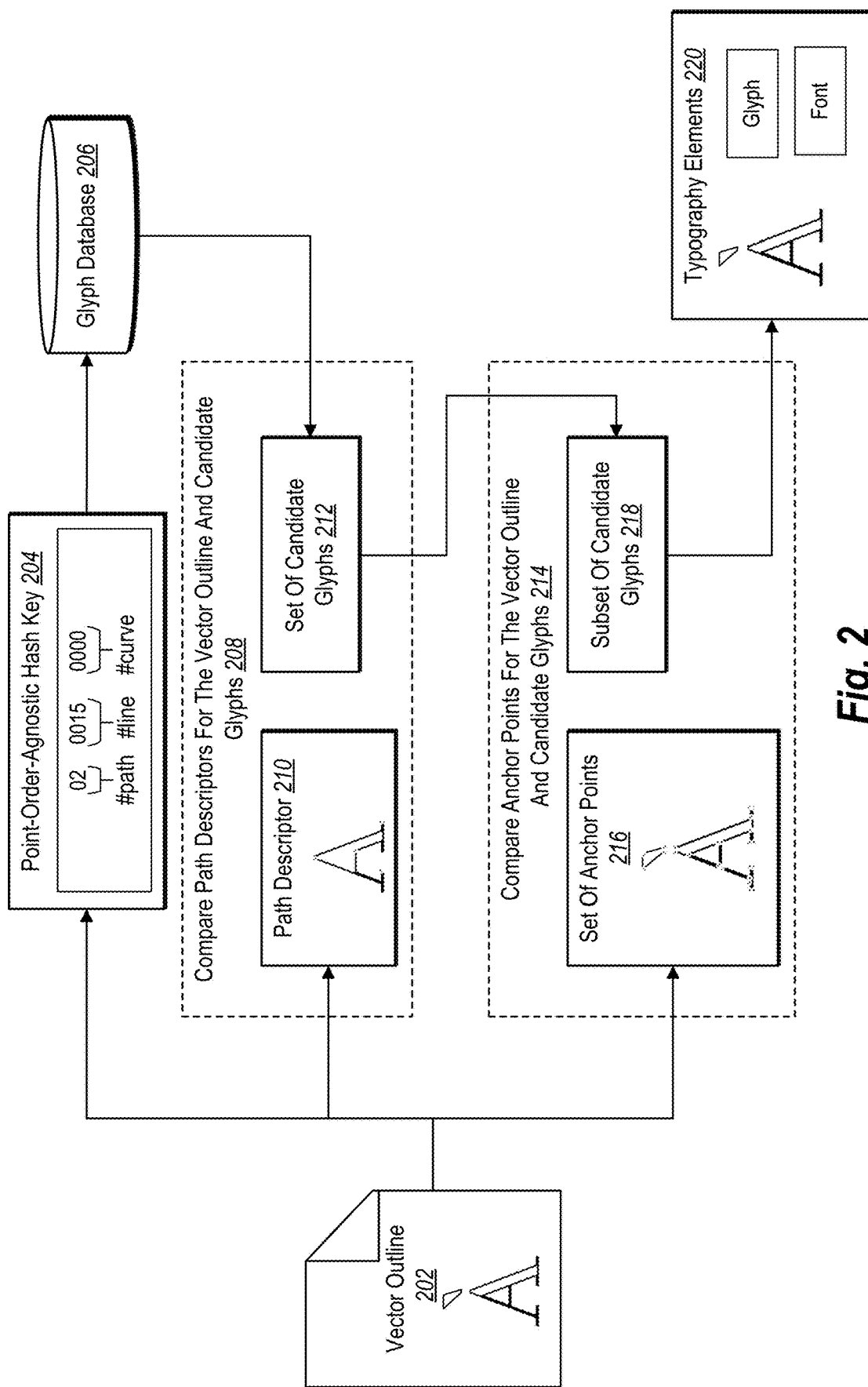
FIG. 2 illustrates an overview of a digital typography detection system detecting typography elements for a vector outline in accordance with one or more embodiments.

As mentioned above, the digital typography detection system 106 can detect typography elements from a vector outline. For instance, FIG. 2 illustrates an overview of the digital typography detection system 106 detecting a glyph and a font from a vector outline in accordance with one or more embodiments herein. In particular, FIG. 2 illustrates a flowchart of the digital typography detection system 106 detecting a glyph and a font from a vector outline using a combination of hash-based querying, path-descriptor matching, and anchor-point matching.

For example, the digital typography detection system 106 can generate a point-order-agnostic hash key for a vector outline and utilize the point-order-agnostic hash key to select candidate glyphs from a glyph database. For instance, as shown in FIG. 2, the digital typography detection system 106 utilizes a point-order-agnostic hash key 204 for a vector outline 202 (e.g., the hash key generated in accordance with one or more embodiments herein) with a glyph database 206. Indeed, as shown in FIG. 2, the digital typography detection system 106 compares the point-order-agnostic hash key 204 with hash keys in the glyph database 206 to select a set of candidate glyphs 212. Additional detail regarding the digital typography detection system 106 generating point-order agnostic hash keys and/or utilizing point-order agnostic hash keys to select candidate glyphs is provided below (e.g., in relation to FIGS. 3 and 4). Furthermore, additional detail regarding the digital typography detection system 106 utilizing (or generating) glyph databases having hash keys is also provided below (e.g., in relation to FIGS. 8A, 8B, and 8C).

Furthermore, the digital typography detection system 106 can determine a path descriptor for a path of a vector outline and utilize the path descriptor to further filter candidate glyphs. In particular, as shown in FIG. 2, the digital typography detection system 106 determines a path descriptor 210 for the vector outline 202 using a single path of the vector outline 202 with a subset of equally spaced anchor points. As further illustrated in FIG. 2, the digital typography detection system 106, in an act 208, compares path descriptors corresponding to paths of the set of candidate glyphs 212 to the path descriptor 210. Indeed, as shown in FIG. 2, the digital typography detection system 106 determines path descriptors corresponding to the paths of the set of candidate glyphs 212 that are an affine transformation of the path descriptor 210 to filter the set of candidate glyphs 212 to a subset of candidate glyphs 218. Additional detail regarding the digital typography detection system 106 determining a path descriptor and/or utilizing a path descriptor to select a subset of candidate glyphs is provided below (e.g., in relation to FIGS. 5A, 5B, 5C, and 6).

After determining the path descriptor 210, the digital typography detection system 106 can determine one or more typography elements for a vector outline by using anchor points corresponding to the vector outline and anchor points corresponding to candidate glyphs from a subset of candidate glyphs. For example, as illustrated in FIG. 2, the digital typography detection system 106 identifies a set of anchor points 216 for the vector outline 202. Before comparing the set of anchor points 216 for the vector outline 202 to sets of anchor points corresponding to candidate glyphs, the digital typography detection system 106 identifies or fetches vector outlines corresponding to candidate glyphs from the subset of candidate glyphs 218 (e.g., candidate glyphs having the same hash keys and the same or similar path descriptors). As further shown in FIG. 2, the digital typography detection system 106 compares the set of anchor points 216 to anchor points corresponding to vector outlines of candidate glyphs from the subset of candidate glyphs 218 (in an act 214). Indeed, the digital typography detection system 106 selects a glyph from the subset of candidate glyphs 218 based on the comparison to determine (or detect) typography elements 220 from the selected glyph (e.g., the digital typography detection system 106 utilizes the selected glyph and a font corresponding to the selected glyph). Additional detail regarding the digital typography detection system 106 determining one or more typography elements for a vector outline by using anchor points corresponding to the vector outline and candidate glyphs is provided below (e.g., in relation to FIG. 7).

Figure 3:
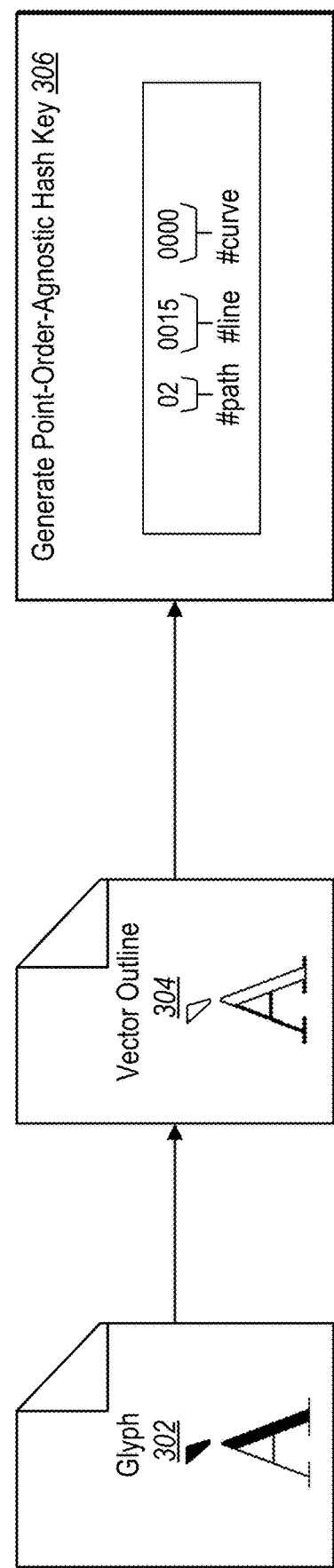
FIG. 3 illustrates a schematic diagram of a digital typography detection system generating a point-order-agnostic hash key for a vector outline in accordance with one or more embodiments.

As mentioned above, the digital typography detection system 106 can generate a point-order-agnostic hash key for a vector outline. For example, FIG. 3 illustrates the digital typography detection system 106 generating a point-order-agnostic hash key. In particular, as shown in FIG. 3, the digital typography detection system 106 receives a digital file that includes a glyph 302. As further illustrated in FIG. 3, the digital typography detection system 106 determines a vector outline 304 for the glyph 302. The digital typography detection system 106 subsequently identifies various attributes (e.g., paths, lines, and curves) from the vector outline 304 and also identifies a number of times those attributes are present within the vector outline 304. Indeed, as illustrated in FIG. 3, the digital typography detection system 106 generates a point-order-agnostic hash key in an act 306 by concatenating the identified number of paths (e.g., 2), the identified number of lines (e.g., 15), and the identified number of curves (e.g., 0) from the vector outline 304.

In one or more embodiments, the digital typography detection system 106 can receive and/or utilize a digital file that contains one or more glyphs (e.g., the digital file portrays text). For instance, the digital file can include, but is not limited to, a PDF document, a text file, or an image file. Furthermore, in some embodiments, the digital typography detection system 106 converts content of the digital file into a vector outline format. In particular, the digital typography detection system 106 can create a digital file that includes one or more vector outlines for one or more glyphs portrayed in the digital file.

Although FIG. 3 illustrates the digital typography detection system 106 receiving a digital file that contains glyphs and creating a vector outline from the digital file, the digital typography detection system 106 can also receive digital files that contain glyphs in a vector outline format. For example, the digital typography detection system 106 can receive a digital file that includes vector outlines for a glyph such that the glyph contains anchor points, lines, curves, and/or paths (e.g., using Bezier form). Indeed, the digital typography detection system 106 can receive a digital file (e.g., a PDF file, SVG file, etc.) comprising vector outlines that portray (or represent) one or more glyphs (e.g., vector outlines without corresponding typography information).

As suggested above, the digital typography detection system 106 can generate a point-order-agnostic hash key from attributes present in a vector outline of a glyph. In particular, the digital typography detection system 106 can determine any variety of attributes from the vector outline of the glyph to generate the point-order-agnostic hash key. For example, the digital typography detection system 106 can determine (or identify) the quantity of occurrences for one or more attributes in the vector outline of the glyph. For instance, the digital typography detection system 106 can determine a quantity of attributes, such as, but not limited to, a number of lines; a number of paths; a number of curves; a number of anchor point from the vector outline of the glyph; a combination of a number of lines and curves; a number of continuous attribute pairs, such as line and curve pairs; and/or a change in curvature. In addition, the digital typography detection system 106 can also determine numerical values (e.g., using multiplication, addition, subtraction, division, exponents, etc.) based on various combinations of attributes from the vector outline of the glyph (e.g., a value resulting from a number of lines added to a number of curves).

In one or more embodiments, the digital typography detection system 106 subsequently generates a point-order-agnostic hash key using any variety of quantities of one or more attributes from the vector outline (e.g., the number of lines, number of paths, number of curves, etc.). For instance, the digital typography detection system 106 can concatenate the quantities of the attributes from the vector outline to generate a hash key. For example, in some embodiments, the digital typography detection system 106 concatenates a number of paths, a number of lines, and a number of curves determined from a vector outline to generate a hash key. Indeed, the digital typography detection system 106 can concatenate any variety of attributes (or quantities related to attributes) from a vector outline to generate a hash key (e.g., a number of lines and a number of curves, a number of paths and a number of lines, a number of lines, etc.). By utilizing quantities of the attributes from the vector outline to generate a hash key, the digital typography detection system 106 can utilize the hash key (i.e., a point-order-agnostic hash key) to search for matching glyphs (e.g., regardless of an ordering of anchor points and/or any circular rotation of the anchor points).

Moreover, in some embodiments, the digital typography detection system 106 can also apply other types of arithmetic operations (e.g., addition, subtraction, multiplication, division, etc.) on the quantities of the attributes from the vector outline to generate a hash key. For example, the digital typography detection system 106 can add a number of paths, a number of lines, and a number of curves determined from a vector outline to generate a hash key. Furthermore, the digital typography detection system 106 can also multiply a number of paths, a number of lines, a number of curves from a vector outline to generate a hash key.

Additionally, the digital typography detection system 106 can also generate a variety of different orders of hash keys. In particular, in some embodiments, the digital typography detection system 106 generates a higher (or lower) order hash key that includes additional (or less) detail (e.g., to narrow or expand a search within a glyph database resulting from an increased or decreased uniqueness in the hash key). For example, the digital typography detection system 106 can include a first order hash key (e.g., having a first level of detail) that is generated by concatenating a number of lines and a number of paths. Moreover, the digital typography detection system 106 can include a second order hash key (e.g., having a second level of detail) that is generated by concatenating a number of lines, a number of paths, and a number of curves. Furthermore, the digital typography detection system 106 can also include a third order hash key (e.g., having a third level of detail) that is generated by concatenating a number of lines, a number of paths, a number of curves, a combination of a number of lines and curves, a number of continuous attribute pairs such as line and curve pairs, and a change in curvature. Indeed, the digital typography detection system 106 can include any variety of combinations from quantities of one or more attributes as an element of the hash key (e.g., by applying one or more arithmetic operations on the combination of quantities of the attributes).

As previously mentioned, in some embodiments, the digital typography detection system 106 is also memory and cache organization efficient. For instance, for memory efficiency and efficient cache organization, the digital typography detection system 106 can generate a point-order-agnostic hash key using 5 bytes (or less). For instance, the digital typography detection system 106 can generate a hash key by concatenating a number of curves (as 16 bits), a number of lines (as 16 bits), and a number of paths (as 8 bits) to result in a point-order-agnostic hash key that uses 5 bytes of memory (e.g., the hash key illustrated in FIG. 3 can utilize 5 bytes or less). Indeed, the digital typography detection system 106 can decrease and/or increase the amount of memory a hash key utilizes by modifying the number of bits available to one or more quantities related to the attributes. Additionally, the digital typography detection system 106 can assign any variety of bits for any variety of quantities of the attributes from the vector outline to generate a memory and cache organization efficient hash key (in accordance with one or more embodiments herein).

In addition, the digital typography detection system 106 can utilize maximum values for a point-order-agnostic hash key. For example, the digital typography detection system 106 can limit a value associated with a quantity of an attribute from a vector outline above the limit of bits assigned to that attribute in a hash key to a max value. As an example, when a vector outline includes 300 closed paths, the digital typography detection system 106 can generate a hash key having a value of 255 based on the number of paths being 300 for the vector outline when the number of paths section of the hash key is assigned to 8 bits. For instance, the digital typography detection system 106 utilizes a value of 255 because 1 byte (e.g., 8 bits) can represent a maximum value of 255 in decimal notation. Likewise, the digital typography detection system 106 can utilize a max value that corresponds to a number of bytes that are assigned to any attribute (e.g., paths, lines, curves) in a hash key when the attribute is present a number of times greater than the maximum limit of the number of bytes available in the hash key.

Furthermore, the digital typography detection system 106 can generate point-order-agnostic hash keys for various numbers of glyphs within a glyph database in accordance with one or more embodiments herein. For example, the digital typography detection system 106 can utilize vector outlines of glyphs (e.g., the candidate glyphs) to generate hash keys that correspond to the glyphs within the glyph database. Indeed, the digital typography detection system 106 can also generate and/or include various orders of hash keys (as described above) for one or more glyphs in a glyph database. In some embodiments, the digital typography detection system 106 can utilize a glyph database that includes point-order-agnostic hash keys that are generated in accordance with one or more embodiments herein.

As mentioned above, the digital typography detection system 106 can utilize a point-order-agnostic hash key to select a set of candidate glyphs for a vector outline. In particular, the digital typography detection system 106 can select a set of candidate glyphs that are likely to match with a glyph portrayed within a vector outline by using hash-based querying. Indeed, as mentioned above, the digital typography detection system 106 can select a set of candidate glyphs with efficient speeds while also remaining point-order agnostic by using hash-based querying with point-order-agnostic hash keys for typography element detection.

Figure 4:
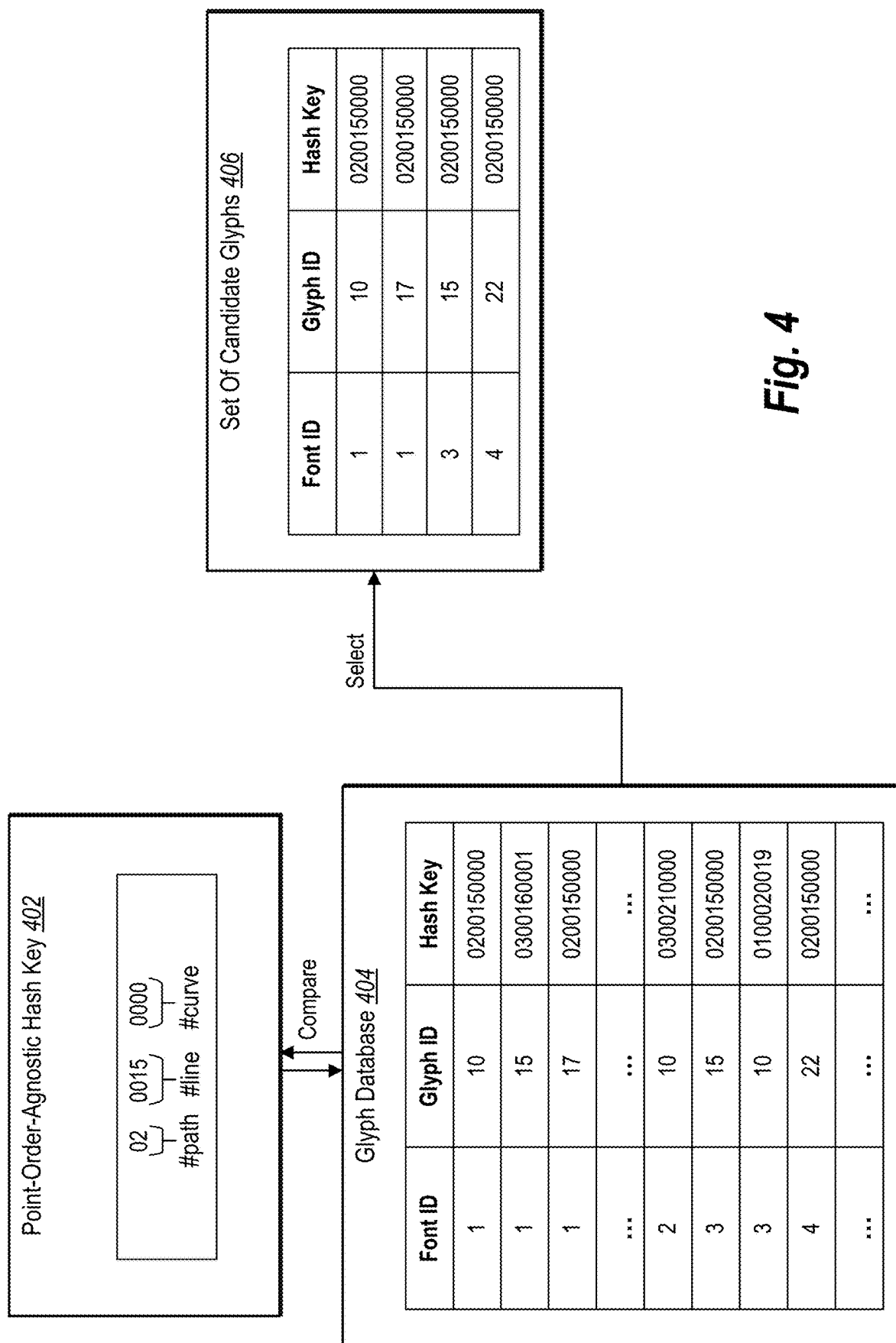
FIG. 4 illustrates a schematic diagram of a digital typography detection system selecting a set of candidate glyphs for a vector outline using hash keys in accordance with one or more embodiments.

For example, FIG. 4 illustrates the digital typography detection system 106 utilizing a point-order-agnostic hash key corresponding to a glyph from a vector outline to select candidate glyphs (and other information) likely to correspond to the glyph. For instance, as shown in FIG. 4, the digital typography detection system 106 can compare a point-order-agnostic hash key 402 (e.g., the hash key generated in FIG. 3 with a hash value of "0200150000") to hash keys within a glyph database 404. Indeed, as illustrated in FIG. 4, the digital typography detection system 106 can match the point-order-agnostic hash key 402 to hash keys in the glyph database 404 to select a set of candidate glyphs 406. In particular, FIG. 4 illustrates the digital typography detection system 106 selecting candidate glyphs (e.g., Glyph IDs and Font IDs) that are associated with the hash key value of the point-order-agnostic hash key 402 (e.g., "0200150000").

In one or more embodiments, the digital typography detection system 106 can generate, access, and/or utilize a glyph database (or hash-based glyph database). In some embodiments, the digital typography detection system 106 can utilize a glyph database that includes point-order-agnostic hash keys (e.g., hash keys generated in accordance with one or more embodiments herein) for a variety of glyphs and/or fonts. Indeed, the digital typography detection system 106 can utilize a glyph database that includes any number of fonts and corresponding glyphs (e.g., 7,000 fonts that can include Chinese, Japanese, and Korean (CJK) glyphs and stylistic glyphs).

As an example, the digital typography detection system 106 can utilize a glyph database that includes glyph IDs, font IDs, and corresponding hash keys (e.g., as shown in FIG. 4). Additionally, the digital typography detection system 106 can organize and/or generate the glyph database using various formats (e.g., a global, regional, and/or a local glyph database). Indeed, the digital typography detection system 106 organizing and/or generating the glyph database using various formats is described in greater detail below (e.g., in relation to FIGS. 8A, 8B, and 8C).

Due to the reduced memory requirements (e.g., a constraint of 200 MB or less which results in approximately a 150 MB for 7,000 fonts) of a glyph database, the digital typography detection system 106 can utilize the glyph database directly on a client device. In some embodiments, the digital typography detection system 106 can utilize a glyph database within active memory of a client device (e.g., the client device 110) while detecting typography elements from a vector outline on the client device (e.g., cached within the client device memory). Furthermore, the digital typography detection system 106 can also utilize (or access) a glyph database that is implemented or stored within a server device (e.g., server device(s) 102) while detecting typography elements from a vector outline (e.g., as a cloud service).

As mentioned above, the digital typography detection system 106 queries (or searches) the glyph database to select candidate glyphs that match a point-order-agnostic hash key corresponding to a glyph from a vector outline. In particular, the digital typography detection system 106 can select one or more glyph IDs and/or one or more Font IDs from entries within a glyph database that are associated with a point-order-agnostic hash key corresponding to a glyph from a vector outline (e.g., as a set of candidate glyphs). Indeed, as described in reference to FIG. 4, the digital typography detection system 106 can match (or compare) hash key values in a glyph database to a hash key generated from a vector outline to select a set of candidate glyphs from the glyph database.

In some embodiments, the digital typography detection system 106 can utilize various orders of hash keys based on a size of a selected set of candidate glyphs from a glyph database. For instance, the digital typography detection system 106 can utilize a higher order hash key (e.g., a hash key having more detail to narrow a search within a glyph database) to reduce a number of candidate glyphs in a selected set of candidate glyphs. In particular, in one or more embodiments, the digital typography detection system 106 determines that the number of selected candidate glyphs based on a first order hash key meets (e.g., is greater than or equal to) an upper-bound threshold number (e.g., a threshold number configured by an administrator of the digital typography detection system 106) of candidate glyphs. Consequently, the digital typography detection system 106 utilizes a second order of hash keys to narrow the candidate glyphs in the set of candidate glyphs (e.g., by selecting fewer candidate glyphs from a glyph database due to the higher level of detail in the hash keys). In addition, the digital typography detection system 106 can also determine that the number of selected candidate glyphs based on the first order of hash keys do not meet (e.g., is less than) a lower-bound threshold number of candidate glyphs. Consequently, the digital typography detection system 106 utilizes a third order of hash keys (e.g., hash keys having less detail) to broaden the candidate glyphs (e.g., select more candidate glyphs from the glyph database due to the hash keys being broader).

Upon selecting a set of candidate glyphs (for the set of candidate glyphs), the digital typography detection system 106 can group the candidate glyphs based on candidate font types. For instance, the digital typography detection system 106 can group candidate glyphs from a set of candidate glyphs by each unique font ID (e.g., each font ID representing a separate candidate font) within the set of candidate glyphs. Indeed, in some embodiments, the digital typography detection system 106 selects multiple candidate glyphs (or glyph IDs) for a single candidate font (or font ID). Moreover, in one or more embodiments, the digital typography detection system 106 selects the same glyph IDs (or glyphs) for multiple font IDs (or candidate fonts).

Furthermore, the digital typography detection system 106 can include a variety of other information corresponding to a glyph within a glyph database. For example, in some embodiments, the digital typography detection system 106 includes path descriptors and/or vector outlines (e.g., path descriptors and/or vector outlines generated in accordance with one or more embodiments herein) for candidate glyphs within a glyph database (e.g., as entries in the glyph database). Indeed, the digital typography detection system 106 can access the path descriptors and/or vector outlines from within the glyph database (for the set of candidate glyphs) while performing path-descriptor matching and/or anchor-point matching in accordance with one or more embodiments herein.

Additionally, the digital typography detection system 106 can also utilize various information corresponding to a glyph by receiving (or fetching) the information for one or more candidate glyphs from another location (e.g., a font repository on a server device and/or a repository within system storage of a client device). In particular, the digital typography detection system 106 can receive (or fetch) path descriptors and/or vector outlines for one or more candidate glyphs (e.g., from a set of candidate glyphs) using corresponding glyph IDs and/or font IDs. For example, the digital typography detection system 106 can perform a request to a server device (e.g., server device(s) 102) with references to one or more glyph IDs and/or font IDs to obtain such information from a font repository (e.g., path descriptor information and/or vector outline information).

Figure 5C:
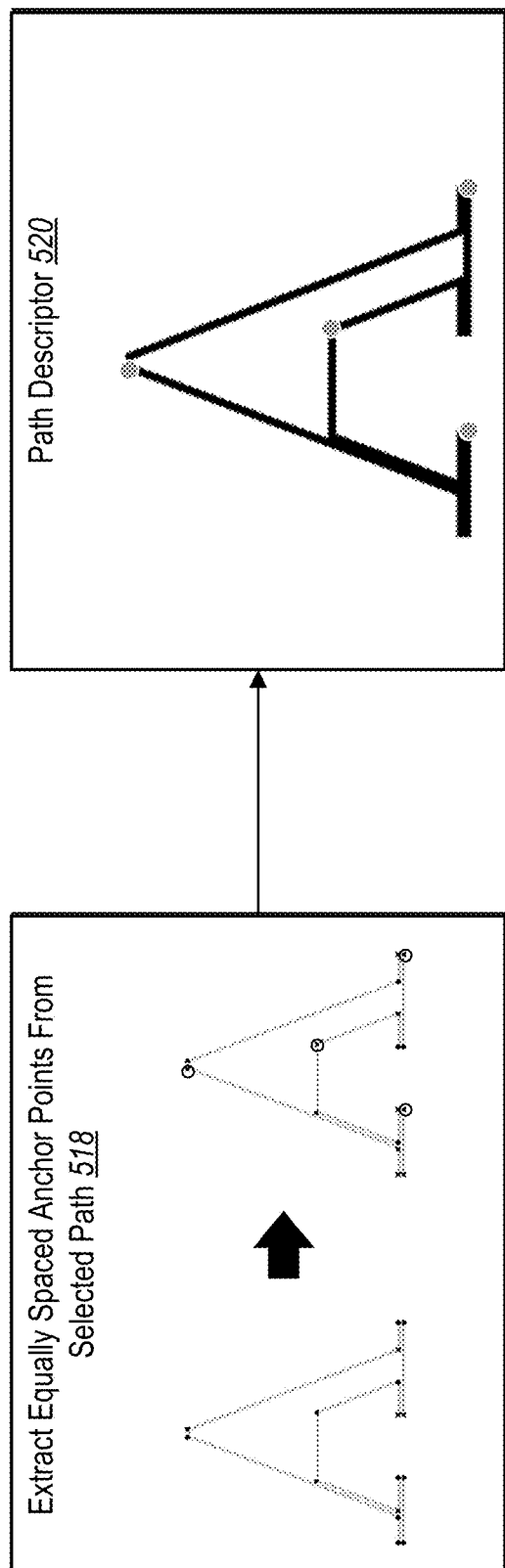

As mentioned above, the digital typography detection system 106 can determine a path descriptor from a path corresponding to a vector outline. Indeed, the digital typography detection system 106 can determine a path to utilize from a vector outline and then determine a path descriptor for that path. As an example, FIGS. 5A and 5B illustrate the digital typography detection system 106 determining a path (e.g., a primary path) for the vector outline. Moreover, FIG. 5C illustrates the digital typography detection system 106 utilizing the path to determine a path descriptor for the vector outline.

As previously mentioned, by determining a single path for a vector outline, the digital typography detection system 106 can determine typography elements from the vector outline while remaining path-order agnostic. As an example, FIG. 5A illustrates the digital typography detection system 106 determining a path to utilize to determine a path descriptor from a vector outline. Indeed, as shown in FIG. 5A, the digital typography detection system 106, in an act 502, identifies paths for the vector outline 304. The digital typography detection system 106 subsequently selects a single path, in an act 504, to utilize for determining (or generating) a path descriptor. The digital typography detection system 106 can utilize various characteristics corresponding to the individual closed paths to select the path in act 504 (e.g., the digital typography detection system 106 selects the path having the most surface area in FIG. 5A).

Indeed, FIG. 5B illustrates various methods for determining a single path to utilize for a path descriptor from a vector outline. As an example, FIG. 5B illustrates the digital typography detection system 106 determining a single path for a vector outline representing a glyph having two identical closed paths. Indeed, the digital typography detection system 106 can utilize various methods in a specific order to determine a path from the vector outline 506 to generate a path descriptor from the path.

For instance, as shown in FIG. 5B, the digital typography detection system 106 can utilize surface areas of the one or more closed paths corresponding to a vector outline to determine (or select) a single path. For example, the digital typography detection system 106 can determine surface areas for the individual closed paths and select the path having the most surface area to use in generating a path descriptor (e.g., as the primary path). In particular, as shown in FIG. 5A, this can result in identifying a single path from a vector outline. However, as shown in FIG. 5B, the vector outline 506 includes two paths with identical surface areas and, therefore, in some embodiments, the digital typography detection system 106 utilizes various other methods to determine a single path.

Indeed, in some embodiments, the digital typography detection system 106 can determine a single path using various attributes corresponding to individual paths of a vector outline (e.g., when a comparison of surface area fails to result in a single path). For instance, the digital typography detection system 106 can sort paths by giving priority to surface area, then to paths having a greater number of curves, then to paths having a greater number of lines. In particular, in one or more embodiments, the digital typography detection system 106 can (i) sort the individual paths of a vector outline using an enclosed area (e.g., from a greatest amount area to a least amount of area), (ii) for paths having an equal area, sort the paths with equal area by a number of curves corresponding to the paths having an equal area, and (iii) for paths having an equal number of curves, sort the paths by a number of lines corresponding to the paths having an equal number of curves. In some embodiments, the digital typography detection system 106 can determine a single path to utilize for a path descriptor by selecting the first grouping of paths (based on having an equal amount of area, number of curves, and lines) that results in a single path. If the digital typography detection system 106 does not identify a grouping of paths having a single path after sorting based on area, curves, and lines, the digital typography detection system 106 can utilize a top-left path as a determined path from paths of a vector outline.

For example, as shown in FIG. 5B, the digital typography detection system 106 determines a path in an act 508 for a vector outline 506. Indeed, as shown in FIG. 5B, the digital typography detection system 106 first determines a path using surface area (in an act 510) of the individual paths from the vector outline 506. As further shown in FIG. 5B, upon determining that the individual paths of the vector outline 506 have an equal amount of area, the digital typography detection system 106 determines a path using vector outline attributes (e.g., sorts the individual paths by giving priority to a number of curves and then a number of lines corresponding to the individual paths from the vector outline 506) in an act 512. Indeed, as shown in FIG. 5B, upon determining that more than one path from the vector outline 506 has an equal amount of area, an equal number of curves, and an equal number of lines, the digital typography detection system 106 determines a path using a top-left path in an act 514 from the sorted path from the vector outline 506. In particular, as shown in FIG. 5B, the digital typography detection system 106 selects the top-left path in the act 514 as the determined path 516 from the vector outline 506.

As an example, the digital typography detection system 106 can sort paths from a vector outline based on enclosed area. For paths having an equal amount of area, the digital typography detection system 106 can further sort these paths by giving priority to a greater number of curves and then a greater number of lines in the paths. Indeed, using this approach, the digital typography detection system 106 can create a set of paths O. In one or more embodiments, the digital typography detection system 106 utilizes the set of paths: $O=\{o_1, o_2, o_n\}$. Indeed, the digital typography detection system 106 can include a group of paths where the same area, number of curves, and lines is represented by $o_i$. Then, enumerating from largest to smallest, the digital typography detection system 106 selects a path from the first group of paths where $|o_i|=1$ (e.g., selects the single element from the set). Moreover, if there are no groups $o_i$ that contain a single element (or path), the digital typography detection system 106 utilizes an element (or path) located on the left and top side.

Although the digital typography detection system 106 can give priority to a number of curves and then to a number of lines when sorting paths to select a single path, the digital typography detection system 106 can also utilize any set of priority rules for any number of attributes. For example, the digital typography detection system 106 can give priority to a number of lines and then a number of curves. Additionally, the digital typography detection system 106 can also utilize attributes such as a combination of a number of lines and curves to sort the paths. Moreover, if a vector outline only includes one path, the digital typography detection system 106 can utilize the one path as the selected path.

As previously mentioned, the digital typography detection system 106 can utilize a determined (or selected) path from a vector outline to determine a path descriptor for a vector outline. Indeed, the digital typography detection system 106 generates (and/or) utilizes a path descriptor to effectuate a more efficient selection of a subset of candidate glyphs likely to match a glyph from a vector outline (e.g., to filter down candidate glyphs prior to using a more intensive matching process). For instance, the digital typography detection system 106 achieves efficiency and speed while accurately detecting typography elements for a vector outline by utilizing a path descriptor in a subsequent matching phase (e.g., the anchor-point matching phase).

FIG. 5C illustrates the digital typography detection system 106 determining a path descriptor for the path selected in the act 504 (as illustrated in FIG. 5A). Indeed, as shown in FIG. 5C, the digital typography detection system 106 can extract an equally spaced number of anchor points from the selected path in an act 518. Indeed, as illustrated in FIG. 5C, the digital typography detection system 106 selects four anchor points from the selected path in the act 518 (e.g., the first, fourth, eighth, and twelfth anchor point). Then, the digital typography detection system 106 utilizes the selected four anchor points to generate (or determine) a path descriptor 520. Indeed, the path descriptor 520 can utilize a small amount of space (e.g., the size of the path descriptor is equal to 8*sizeof(float) which can equal 32 bytes).

In one or more embodiments, the digital typography detection system 106 can extract a threshold number of equally spaced anchor points from a path. Indeed, the digital typography detection system 106 can utilize various numbers of anchor points. For example, a higher threshold number can result in a more detailed path descriptor, yet a slower (but more accurate) matching process for the digital typography detection system 106. Moreover, a smaller threshold can result in a less detailed path descriptor with a faster (yet less precise) matching process for the digital typography detection system 106. Indeed, the threshold number of anchor points can be configured by an administrator based on user inputs from a computing device. In one or more embodiments, the digital typography detection system 106 utilizes four equally spaced anchor points to determine a path descriptor.

Additionally, the digital typography detection system 106 can also utilize midpoint information of path segments for additional anchor points when a selected path includes less than a threshold number of anchor points. For example, the digital typography detection system 106 can generate anchor points for a path starting from any anchor point of the path by determining midpoints between the starting anchor point and the subsequent anchor point (e.g., between a segment). Indeed, the digital typography detection system 106 can do so until the digital typography detection system 106 is capable of selecting a threshold number of equally spaced anchor points. For example, if a path has three anchor points, the digital typography detection system 106 can generate anchor points at midpoint segments of the path to create a total of twelve anchor points for the path. The digital typography detection system 106 can subsequently extract four equally spaced anchor points from the twelve anchor points to generate a path descriptor for the selected path.

Furthermore, as mentioned above, the digital typography detection system 106 can select candidate glyphs by using path descriptors from a vector outline and candidate glyphs. In particular, the digital typography detection system 106 can further filter a set of candidate glyphs (e.g., selected based on hash keys) by matching a path descriptor corresponding to the vector outline and path descriptors corresponding to the candidate glyphs. In particular, the digital typography detection system 106 determines whether a path descriptor of a candidate glyph is an affine transformation of the path descriptor corresponding to the vector outline to select the candidate glyph.

Figure 6:
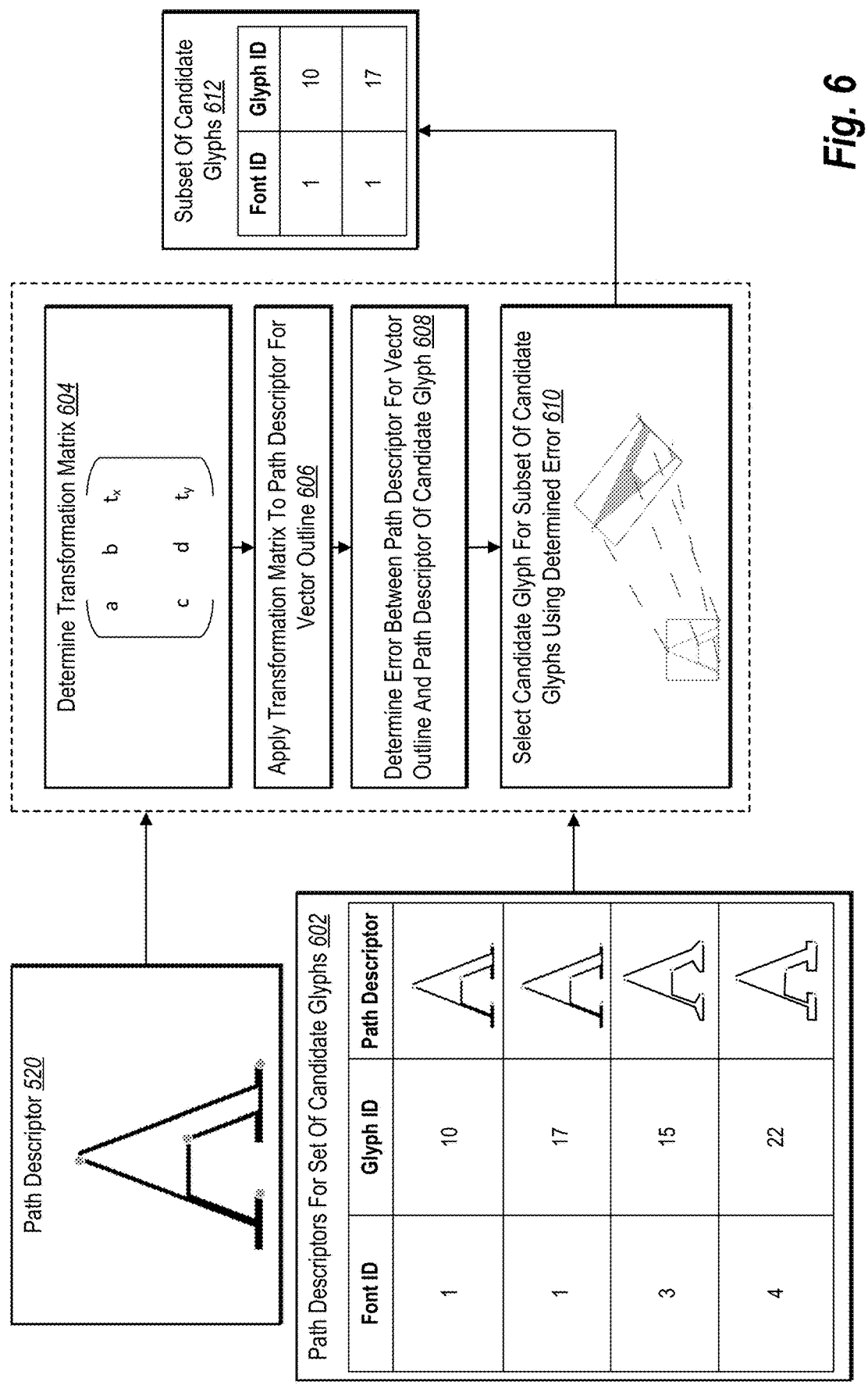
FIG. 6 illustrates a schematic diagram of a digital typography detection system selecting a subset of candidate glyphs for a vector outline using path-descriptor comparisons in accordance with one or more embodiments.

For instance, FIG. 6 illustrates the digital typography detection system 106 comparing path descriptors for a vector outline and a set of candidate glyphs to select a subset of candidate glyphs. Indeed, as shown in FIG. 6, the digital typography detection system 106 utilizes a transformation analysis (e.g., an affine-transformation analysis) between path descriptors of the vector outline and a candidate glyph to select a subset of candidate glyphs. For example, as shown in FIG. 6, the digital typography detection system 106 utilizes a transformation analysis comparing the path descriptor 520 (e.g., corresponding to the vector outline 304) and path descriptors corresponding to the set of candidate glyphs 602 (e.g., from the set of candidate glyphs selected in FIG. 4). Indeed, the path descriptors for the set of candidate glyphs 602 include path descriptors corresponding to glyph IDs of the candidate glyphs (e.g., fetched from a font repository or memory cache that includes the path descriptors). As illustrated in FIG. 6, the path descriptors for the set of candidate glyphs 602 are based on selected paths for each candidate glyph.

As shown in FIG. 6, as part of a transformation analysis, the digital typography detection system 106 determines a transformation matrix in an act 604 between the path descriptor 520 and a path descriptor for a candidate glyph from the path descriptors for the set of candidate glyphs 602 (e.g., between the anchor points corresponding to the path descriptors). For example, the digital typography detection system 106 can determine transformation values that will likely transform a path descriptor corresponding to a vector outline into a path descriptor of a candidate glyph. Indeed, as shown in FIG. 6, the digital typography detection system 106 represents the transformation values within a transformation matrix (as described in greater detail below).

As illustrated in FIG. 6, the digital typography detection system 106 further applies the determined transformation matrix to the path descriptor for the vector outline in an act 606. In particular, the digital typography detection system 106 transforms the path descriptor 520 using the determined transformation matrix (from the act 604). Indeed, the transformed path descriptor represents an outcome of using the determined transformation matrix on the vector outline.

Upon transforming the path descriptor 520, as shown in FIG. 6, the digital typography detection system 106 determines an error between the transformed path descriptor of the vector outline and the path descriptor of the candidate glyph in an act 608. In particular, the digital typography detection system 106 compares the transformed path descriptor (from the act 606) to the candidate glyph to determine an error between the transformed path descriptor and the candidate glyph. The error can be a numerical value that represents the distance between the transformed path descriptor and the path descriptor of the candidate glyph (as described below).

In an act 610, the digital typography detection system 106 selects the candidate glyph for a subset of candidate glyphs by using the determined error (from the act 608). Indeed, in one or more embodiments, the digital typography detection system 106 selects the candidate glyph for the subset of candidate glyphs if the determined error meets a threshold-error value. Moreover, as illustrated in FIG. 6, the digital typography detection system 106 performs an affine-transformation analysis between the path descriptor 520 and each path descriptor from the set of candidate glyphs 602 to select candidate glyphs for a subset of candidate glyphs 612. As shown in FIG. 6, the digital typography detection system 106 selects the path descriptor for glyph ID 10 and glyph ID 17 in the subset of candidate glyphs 612 after determining that the path descriptors of those candidate glyphs are an affine transformation of the path descriptor 520.

In one or more embodiments, the digital typography detection system 106 determines a transformation matrix between a path descriptor of a vector outline and a path descriptor of a candidate glyph by solving for a transformation matrix between the path descriptors. For example, in some embodiments, the digital typography detection system 106 represents a path descriptor of a vector outline as matrix A. Additionally, the digital typography detection system 106 can represent a path descriptor of a candidate glyph as matrix B. Then, the digital typography detection system 106 can determine a transformation matrix (e.g., $X^T$) using the following function:

$$A \cdot X^T = B \text{ where } X^T = \begin{pmatrix} a & b & tx \\ c & d & ty \end{pmatrix},$$

$$A = \begin{pmatrix} P_{1x} & P_{1y} & 1 \\ P_{2x} & P_{2y} & 1 \\ P_{3x} & P_{3y} & 1 \\ P_{4x} & P_{4y} & 1 \end{pmatrix}, \text{ and } B = \begin{pmatrix} P_{1x} & P_{1y} & 1 \\ P_{2x} & P_{2y} & 1 \\ P_{3x} & P_{3y} & 1 \\ P_{4x} & P_{4y} & 1 \end{pmatrix}.$$

In some embodiments, the digital typography detection system 106 utilizes a linear solver to solve for (or determine) a transformation matrix. For example, the digital typography detection system 106 can utilize a linear solver in Eigen to determine a transformation between matrices of path descriptors (e.g., A and B from above). Specifically, in one or more embodiments, the digital typography detection system 106 utilizes (in Eigen) X=A.colPivHouseholderQr( ).solve(B) to determine a transformation matrix between A and B (e.g., the path descriptors of the vector outline and candidate glyph respectively). Indeed, the digital typography detection system 106 can utilize various other methods/solvers to determine a transformation matrix.

Furthermore, in one or more embodiments, the digital typography detection system 106 determines an error for the determined transformation matrix between the path descriptors. In particular, in some embodiments, the digital typography detection system 106 applies the transformation matrix to the path descriptor of the vector outline to obtain a transformed path descriptor. The digital typography detection system 106 can subsequently determine an error (or error value) between the transformed path descriptor and the path descriptor of the candidate glyph. In particular, the digital typography detection system 106 can utilize various approaches to determine an error value between the transformed path descriptor and the path descriptor of the candidate glyph.

In some embodiments, the digital typography detection system 106 can utilize an L2 distance between the transformed path descriptor and the path descriptor of the candidate glyph to determine an error value (e.g., based on a distance between the one or more anchor points of the path descriptors). For instance, the digital typography detection system 106 can utilize an L2 distance between the matrix corresponding to the path descriptor of vector outline transformed by the determined transformation matrix and the matrix of the path descriptor of candidate glyph using the following function: Error=$\|A \cdot X^T - B\|$.

As mentioned above, the digital typography detection system 106 can further utilize the error value (e.g., the determined error) to determine whether to select the candidate glyph for a subset of candidate glyphs. For instance, the digital typography detection system 106 can compare the error value to a threshold-error value. In particular, if the error value satisfies a threshold-error-value analysis (e.g., is less than a threshold-error value and/or less than or equal to the threshold-error value), the digital typography detection system 106 can indicate the path descriptor of the candidate glyph as matching the path descriptor of the vector outline (e.g., as an affine transformation). Indeed, the digital typography detection system 106 can select and include the candidate glyph in a subset of candidate glyphs when the error value corresponding to the candidate glyph satisfies the threshold-error analysis.

In one or more embodiments, the digital typography detection system 106 compares path descriptors to determine matching path descriptors by utilizing a Procrustes analysis (as the transformation analysis). In particular, the digital typography detection system 106 can utilize a Procrustes analysis between a path descriptor of a vector outline and a path descriptor of a candidate glyph to determine whether to select the candidate glyph as a matching candidate glyph (e.g., to include the candidate glyph in a subset of candidate glyphs). For example, the digital typography detection system 106 can translate, rotate, and/or scale a path descriptor of a vector outline to superimpose the path descriptor onto a path descriptor of a candidate glyph (e.g., Procrustes superimposition) until a similar placement and size is achieved between the path descriptors. Then, the digital typography detection system 106 can determine the amount of similarity achieved between the path descriptors (e.g., using an error analysis as described above).

In some embodiments, the digital typography detection system 106 performs a Procrustes analysis prior to performing an affine-transformation analysis (as described above) to match path descriptors (e.g., to give less priority to shear transformations). Indeed, in some embodiments, the digital typography detection system 106 performs a Procrustes analysis to determine error values and filters candidate glyphs by comparing the error values from the Procrustes analysis with a first threshold error value. The digital typography detection system 106 can subsequently perform a transformation analysis (as described above) between path descriptors of the filtered candidate glyphs and the path descriptor of the vector outline. Additionally, in some embodiments, the digital typography detection system 106 can determine whether shearing transformations were present in path descriptors of candidate glyphs that matched the path descriptor of the vector outline using the transformation analysis (as described above). Indeed, if shearing transformations are present in a path descriptor of a candidate glyph, the digital typography detection system 106 can discard the candidate glyph to give less priority to shearing transformations in the path-descriptor matching phase.

By utilizing a transformation analysis as described above, the digital typography detection system 106 can detect non-uniform scaling between path descriptors. Furthermore, in one or more embodiments, the digital typography detection system 106 provides a lesser priority to path descriptors of candidate glyphs that are matched due to shear transformations. Moreover, the digital typography detection system 106 can utilize a transformation analysis in accordance with one or more embodiments herein on both rigid and non-rigid transformations.

Additionally, the digital typography detection system 106 can also include and/or utilize the determined transformation matrix as transformation information for a glyph corresponding to a vector outline. In particular, the digital typography detection system 106 can include (or associate) transformation matrices utilized for matching path descriptors to the one or more candidate glyphs selected for a subset of candidate glyphs. Indeed, the digital typography detection system 106 can utilize the transformation matrices to provide transformation information for the glyph portrayed in the vector outline upon selecting a matching candidate glyph (e.g., after selecting a glyph using the anchor-point matching phase in accordance with one or more embodiments herein). For instance, the digital typography detection system 106 can utilize a transformation matrix to provide information, such as, but not limited to, translation, scaling, rotation, and/or shearing information.

Moreover, the digital typography detection system 106 can also match a path descriptor of a vector outline to a path descriptor of a candidate glyph using segment information corresponding to the path descriptors. Specifically, in one or more embodiments, the digital typography detection system 106 can include, access, and/or generate segment information for path descriptors. For example, the digital typography detection system 106 can utilize anchor points (e.g., control handles of the anchor points) to determine whether a segment between two anchor points of a path descriptor represents a line or a curve. Then, the digital typography detection system 106 can generate segment information for the path descriptor as a concatenation of the segment information (e.g., a concatenation of labels for lines or curves). For example, in a path having a line followed by a curve, followed by a line, and then followed by a curve, the digital typography detection system 106 can include segment information indicating a sequence of "LCLC" for the path descriptor.

The digital typography detection system 106 can subsequently access segment information corresponding to the path descriptors and compare the segment information of the path descriptors to find matching path descriptors. For example, if a path descriptor corresponds to segment information indicating a sequence "LCLC" for a path descriptor, the digital typography detection system 106 can determine other path descriptors that match such segment information (e.g., a path descriptor of a candidate glyph corresponding to segment information of "LCLC"). For a path descriptor having four equally spaced anchor points, for instance, the digital typography detection system 106 can include segment information indicating a possible sequence from any combination of lines and curves (e.g., "LLCL," "CLLL," "CCCC," "LCLC," or "LLLL," etc.). In some embodiments, the digital typography detection system 106 can match path descriptors based on any starting point of the segment information sequence (e.g., segment information of "LCLC" can be matched with "LCLC" or "CLCL").

Indeed, in one or more embodiments, the digital typography detection system 106 can utilize segment information to match path descriptors of candidate glyphs with the path descriptor of the vector outline—prior to matching the path descriptors using a transformation analysis. For instance, the digital typography detection system 106 can first utilize segment information to filter candidate glyphs and then select the subset of candidate glyphs using a transformation analysis on the filtered candidate glyphs. Based on the segment information, the digital typography detection system 106 can further increase efficiency by limiting the number of path descriptors on which a digital typography detection system 106 performs a transformation analysis.

Furthermore, the digital typography detection system 106 can introduce an anchor-point order amongst path descriptors (e.g., path descriptors in a glyph database and/or from a vector outline). In particular, the digital typography detection system 106 can determine an enclosed area for a path descriptor using a specific ordering of anchor points (e.g., clock-wise or counter clock-wise). Indeed, in some embodiments, the digital typography detection system 106 determines a positive or negative area value based on the ordering of anchor points in a path descriptor. In one or more embodiments, digital typography detection system 106 utilizes anchor-point ordering in each path descriptor that results in each path descriptor having a negative enclosed area value (or a positive enclosed area value).

Furthermore, the digital typography detection system 106 can also utilize segment information to determine if multiple path descriptors include a similar anchor-point order. For instance, the digital typography detection system 106 can match sequences of attributes (e.g., lines or curves) represented in segment information (as described above) to determine if two path descriptors utilize a similar anchor-point order. For example, the segment information creates a circular sequence of attributes (e.g., lines or curves) for path descriptors. The digital typography detection system 106 can compare two or more path descriptors using segment information by determining if any one of possible sequences of attributes (either in a clock-wise or counter clock-wise fashion starting from any anchor point) match. For example, if a first path descriptor having segment information with a sequence of LCLC (which represents lines and curves), the digital typography detection system 106 can determine that an anchor-point order for the first path descriptor is similar to an anchor-point order of a second path descriptor having segment information sequence of CLCL.

In some embodiments, the digital typography detection system 106 can further optimize typography detection for a vector outline by performing the subsequent matching phase (e.g., the anchor-point matching phase) for a specific group of candidate glyphs from a subset of candidate glyphs. In particular, the digital typography detection system 106 can determine a specific group of candidate glyphs from a subset of candidate glyphs using candidate font information. For instance, the digital typography detection system 106 can determine a candidate font (from candidate fonts associated with a set of candidate glyphs) that has a higher number of candidate glyphs compared to other candidate fonts in the set of candidate glyphs. For example, if a first candidate glyph from the subset of candidate glyphs corresponds to font 1 and font 3, a second candidate glyph corresponds to font 3 and font 4, a third candidate glyph corresponds to font 1 and font 2, and a fourth candidate glyph corresponds to font 3 and font 4, the digital typography detection system 106 can first perform the subsequent matching phase (e.g., the anchor-point matching phase) on the candidate glyphs associated with font 3 (e.g., the first candidate glyph, the second candidate glyph, and the fourth candidate glyph).

Indeed, the digital typography detection system 106 can first perform the subsequent matching phase (e.g., the anchor-point matching phase) on candidate glyphs corresponding to the determined candidate font (having more candidate glyphs). In some embodiments, if the digital typography detection system 106 identifies a candidate glyph that matches a vector outline, the digital typography detection system 106 no longer performs the subsequent matching phase on other candidate glyphs from the subset of candidate glyphs. Moreover, if the first group of candidate glyphs corresponding to the determined candidate font do not result in an accurate match, the digital typography detection system 106 can proceed to perform the subsequent matching phase on a second grouping of candidate glyphs (e.g., based on another candidate font) and/or on all of the remaining candidate glyphs from the subset of candidate glyphs.

Furthermore, the digital typography detection system 106 can also utilize font recognition technologies to increase the efficiency of the matching process of the digital typography detection system 106. For instance, the digital typography detection system 106 can utilize font recognition technologies (e.g., such as deep font recognition) to determine which font from candidate fonts corresponding to a subset of candidate glyphs is most likely represented in a vector outline. The digital typography detection system 106 can then proceed to perform the subsequent matching phase (e.g., the anchor-point matching phase) on a group of candidate glyphs that correspond to the determined (or recognized) candidate font. Indeed, if the group of candidate glyphs that correspond to the determined candidate font do not result in an accurate match for a vector outline, the digital typography detection system 106 can proceed to perform the subsequent matching phase on a second group of candidate glyphs corresponding to a second candidate font (or on all remaining candidate glyphs in a subset of candidate glyphs). In some embodiments, the digital typography detection system 106 determines a font using one or more font recognition technologies prior to selecting (or searching for) candidate glyphs within a glyph database and selects the candidate glyphs based on a combination of hash keys and the determined font.

While the digital typography detection system 106 can transform a path descriptor for a vector outline to compare with a path descriptor of a candidate glyph, the digital typography detection system 106 can also transform the path descriptor for the candidate glyph. For example, in one or more embodiments, the digital typography detection system 106 performs the transformation analysis by determining a transformation between a path descriptor for a candidate glyph and a path descriptor for a vector outline. Then, the digital typography detection system 106 can apply the transformation matrix to the path descriptor for the candidate glyph. Moreover, the digital typography detection system 106 can determine whether the path descriptors match each other by determining an error between the transformed path descriptor for the candidate glyph ($B \cdot X^T$) and the path descriptor for the vector outline (A). For instance, the digital typography detection system 106 determines the error using the following function: $Error = \|B \cdot X^T - A\|$. Indeed, the digital typography detection system 106 can determine whether the determined error satisfies a threshold error analysis to select the candidate glyph for a subset of candidate glyphs (as described above).

In some embodiments, the digital typography detection system 106 determines a set of candidate glyphs that includes only one candidate glyph after performing path-descriptor matching. Indeed, the digital typography detection system 106 can select the single candidate glyph and a corresponding font respectively as the glyph and the font for the vector outline. Upon selecting such a single candidate glyph, the digital typography detection system 106 can utilize the single candidate glyph for the vector outline—without fetching vector outline information for the single candidate glyph and without performing anchor-point matching between the vector outline and the single candidate glyph.

As previously mentioned, the digital typography detection system 106 can select a glyph from a subset of candidate glyphs using anchor-point matching. In particular, the digital typography detection system 106 can utilize anchor-point matching on a subset of candidate glyphs that are selected using path-descriptor matching. By utilizing anchor-point matching to select a glyph after using path-descriptor matching, the digital typography detection system 106 can accurately determine a matching glyph (and/or typography elements) for the glyph portrayed within a vector outline. By applying such path-descriptor matching, the digital typography detection system 106 can make a more detailed and/or robust detection (e.g., accounting for the entire vector outline rather than a single path). Moreover, the digital typography detection system 106 can utilize anchor-point matching with increased efficiency because the candidate glyphs are narrowed down to the candidate glyphs most likely to match with the vector outline (e.g., because of the hash-based querying and path-descriptor matching phases).

For example, in one or more embodiments, the digital typography detection system 106 can select a glyph from candidate glyphs by matching a vector outline to vector outlines corresponding to the candidate glyphs. In particular, the digital typography detection system 106 can determine whether a vector outline is an affine transformation of a vector outline of a candidate glyph to match the vector outlines. Indeed, the digital typography detection system 106 can utilize a transformation analysis (e.g., similar to the transformation analysis described in one or more embodiments above for matching path descriptors) between anchor points (and/or control points in Bezier form) of a vector outline (e.g., all anchor points corresponding to the vector outline) and anchor points of a vector outline of a candidate glyph (e.g., all anchor points corresponding to the candidate glyph). Indeed, the digital typography detection system 106 can select a glyph by determining a candidate glyph that corresponds to a vector outline that is an affine transformation of the vector outline.

Figure 7:
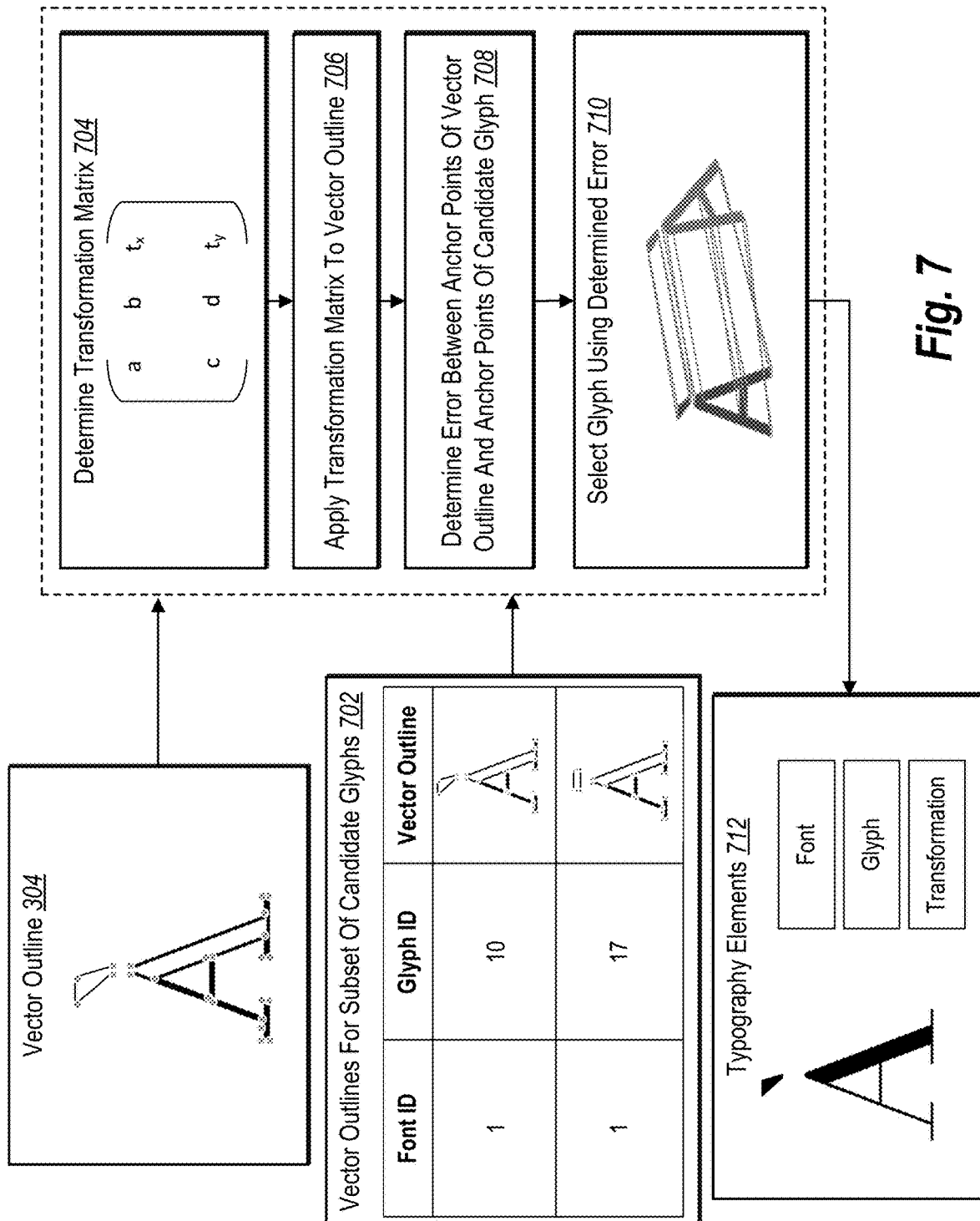
FIG. 7 illustrates a schematic diagram of a digital typography detection system determining typography elements for a vector outline using anchor-point comparisons in accordance with one or more embodiments.

As an example, FIG. 7 illustrates the digital typography detection system 106 comparing a vector outline to vector outlines from a subset of candidate glyphs to select a glyph for the vector outline. As shown in FIG. 7, the digital typography detection system 106 utilizes a transformation analysis on anchor points of the vector outline to vector outlines of candidate glyphs from the subset of candidate glyphs. Indeed, the vector outlines for the subset of candidate glyphs 702 include vector outlines corresponding to glyph IDs of the candidate glyphs (e.g., vector outlines fetched using glyph IDs and/or font IDs from a font repository or memory cache that includes the vector outlines). For instance, as shown in FIG. 7, the digital typography detection system 106 utilizes a transformation analysis between the vector outline 304 and vector outlines for the subset of candidate glyphs 702 (e.g., from the subset of candidate glyphs selected in FIG. 6). Upon determining a matching vector outline from the vector outlines for the subset of candidate glyphs 702, the digital typography detection system 106 can utilize typography elements 712 associated with the selected glyph for the vector outline (e.g., font information, glyph information, and/or transformation information).

As shown in FIG. 7, as part of a transformation analysis, the digital typography detection system 106 determines a transformation matrix in an act 704 between the vector outline 304 and a vector outline for a candidate glyph from the vector outlines for the subset of candidate glyphs 702 (e.g., between the anchor points corresponding to the vector outlines). As shown in FIG. 7, the digital typography detection system 106 applies the determined transformation matrix to the vector outline 304 in an act 706. Upon transforming the vector outline 304, the digital typography detection system 106 determines an error between the transformed vector outline 304 and the vector outline of the candidate glyph in an act 708.

As further shown in FIG. 7, the digital typography detection system 106 (in an act 710) selects a glyph from the candidate glyph by using the determined error (from the act 708). The digital typography detection system 106 subsequently identifies typography elements 712 from the selected candidate glyph (from the act 710) for the vector outline (e.g., font information, glyph information, and/or transformation information).

In one or more embodiments, the digital typography detection system 106 determines a transformation matrix between a vector outline and a vector outline of a candidate glyph using anchor points of the vector outline as described in FIG. 6 (e.g., using anchor points of the vector outline rather than a path descriptor). Moreover, the digital typography detection system 106 can transform a vector outline using the determined transformation matrix and determine an error between the transformed vector outline and the vector outline of the candidate glyph as described above (e.g., in relation to FIG. 6). Then, the digital typography detection system 106 can utilize the determined error to determine whether the candidate glyph is the matching glyph based on a threshold-error-value analysis (e.g., as described in FIG. 6). If the error corresponding to the transformed vector outline and the candidate glyph satisfies the threshold-error-value analysis, the digital typography detection system 106 can select the candidate glyph as the glyph for the vector outline.

In one or more embodiments, the digital typography detection system 106 utilizes a transformation analysis (as described above) between a vector outline and vector outlines of each candidate glyph from a subset of candidate glyphs to select a glyph. Indeed, the digital typography detection system 106 can determine an error value between a vector outline and vector outlines of each candidate glyph from a subset of candidate glyphs. The digital typography detection system 106 can subsequently select a glyph from the subset of candidate glyphs based on error values that satisfy the threshold-error-value analysis. In some embodiments, the digital typography detection system 106 selects a candidate glyph corresponding to the lowest error value from amongst error values of candidate glyphs when more than one of the candidate glyphs correspond to error values that satisfy the threshold-error-value analysis.

Additionally, in one or more embodiments, the digital typography detection system 106 utilizes priority rules to select a glyph from a subset of candidate glyphs when more than one of the candidate glyphs correspond to error values that satisfy the threshold-error-value analysis. For instance, the digital typography detection system 106 can give priority based on transformation information. In particular, the digital typography detection system 106 can prioritize (e.g., select a glyph) from the candidate glyphs corresponding to error values that satisfy the threshold-error-value analysis by using the candidate glyph that corresponds with the least amount of transformation (e.g., a minimal transformation). In some embodiments, the digital typography detection system 106 can compare results of other vector outlines (e.g., vector outlines from the same digital file) to determine a common font amongst the vector outlines (e.g., determined in accordance with one or more embodiments herein). Then, the digital typography detection system 106 can prioritize from the candidate glyphs corresponding to error values that satisfy the threshold-error-value analysis by using the candidate glyph that corresponds to the determined common font amongst the multiple vector outlines.

Furthermore, in some embodiments, the digital typography detection system 106 utilizes the transformation matrix determined between a path descriptor and a path descriptor of a candidate glyph to transform the vector outline (e.g., using anchor points of the vector outline). In particular, the digital typography detection system 106 can utilize the transformation matrix determined between path descriptors to transform a vector outline (or a vector outline of a candidate glyph). Then, the digital typography detection system 106 can calculate an error between the vector outline of the candidate glyph and transformed vector outline. In particular, the digital typography detection system 106 can represent A as a vector outline matrix, $X^T$ as the transformation matrix, and B as a candidate glyph vector outline matrix and calculate error using the following function: Error=$\|A \cdot X^T - B\|$.

In one or more embodiments, the digital typography detection system 106 sorts anchor points corresponding to the vector outline and the candidate glyph prior to calculating an error value. By doing so, the digital typography detection system 106 removes order dependency of anchor points (and segments) of the vector outlines. In particular, the digital typography detection system 106 can sort anchor points of a transformed vector outline (e.g., A') and also can sort the anchor points of a vector outline of a candidate glyph (e.g., B'). Then, the digital typography detection system 106 can calculate the error value using the following function: Error=$\|A'-B'\|$.

Moreover, in some embodiments, the digital typography detection system 106 determines one or more typography elements (or typography information) from a selected glyph (e.g., a selected candidate glyph). Indeed, the digital typography detection system 106 can determine (or reference) a glyph using the glyph ID associated with the selected candidate glyph. Furthermore, the digital typography detection system 106 can also determine (or reference) a font that corresponds to the selected glyph (e.g., using the glyph ID or font ID associated with the candidate glyph). Additionally, the digital typography detection system 106 can utilize a transformation matrix (e.g., a transformation matrix determined between path descriptors and/or vector outlines of a vector outline and a vector outline of a candidate glyph) as transformation information for the vector outline (e.g., translation, scaling, rotation, and/or shearing information).

The digital typography detection system 106 can utilize (or perform) any of the phases described herein (e.g., hash-based querying, path-descriptor matching, anchor-point matching) partially (or in a different order) to detect (or determine) typography elements from a vector outline. For example, the digital typography detection system 106 can perform hash-based querying followed by anchor-point matching in accordance with one or more embodiments herein to determine typography elements for a vector outline. Moreover, the digital typography detection system 106 can also perform path-descriptor matching followed by anchor-point matching to determine typography elements for a vector outline.

Furthermore, as mentioned above, the digital typography detection system 106 can generate a memory efficient glyph database. In particular, the digital typography detection system 106 can process information for one or more fonts and generate a glyph database that is concise and efficient (e.g., in terms of memory) in a cache format. Indeed, the digital typography detection system 106 can generate a glyph database that includes at least one of point-order-agnostic hash keys, path descriptors, and/or vector outlines for one or more glyphs corresponding to at least one font.

For example, in one or more embodiments, the digital typography detection system 106 utilizes glyph IDs in a continuous space. Indeed, the digital typography detection system 106 can generate a glyph database by generating a file (e.g., a cache file) that includes a count of glyphs (e.g., N) in a first line of the file (where glyph IDs can be a value of 0 to a value of N−1). For each subsequent number of bytes corresponding to an entry in the cache file buffer, the digital typography detection system 106 includes a glyph ID with hash key and path descriptor information. Indeed, the digital typography detection system 106 can locate a path descriptor of an ith glyph ID by fetching information corresponding to an offset of i*sizeof(descriptor) in the file stream. Furthermore, in some embodiments, after path descriptor information for each glyph ID, the digital typography detection system 106 includes a hash key (e.g., with a fixed size). Indeed, the digital typography detection system 106 can fetch a path descriptor of an ith glyph ID by fetching information corresponding to an offset of i*(sizeof(descriptor)+sizeof(hashkey) in the file stream.

In some embodiments, the digital typography detection system 106 generates a glyph database which includes a hash key followed by a glyph ID (and a path descriptor) for one or more glyphs in a digital file for efficient processing. Indeed, the digital typography detection system 106 can locate hash keys that match with a hash key of an input vector to fetch glyph IDs (and/or path descriptor information). By utilizing one or more glyph databases described herein, the digital typography detection system 106 can stream a large number of fonts (e.g., 6,500 fonts) in a small memory space (e.g., 132 MB).

Furthermore, in one or more embodiments, the digital typography detection system 106 generates a glyph database that includes a hash key and a glyph ID for one or more glyphs of at least one font. In particular, the digital typography detection system 106 can generate a glyph database (e.g., as a cache file) that includes a fixed size hash key and a fixed size glyph ID for each glyph. For instance, the memory requirement for such a glyph database (if every node in a glyph database has a single glyph for N number of glyphs) is (hash key size)*4*N+(GID)*2*N. For example, with such an organization, the digital typography detection system 106 can generate a glyph database for 6,500 fonts in a small space of 12 MB or less.

In some embodiments, the digital typography detection system 106 can utilize a glyph database within memory (e.g., within RAM). In particular, the digital typography detection system 106 can store a glyph database within RAM and access the glyph database for hash-based querying, path-descriptor matching, and/or anchor-point matching from within RAM. Indeed, the digital typography detection system 106 can operate with increased speeds by including the glyph database within RAM and accessing the glyph database within RAM.

Moreover, the digital typography detection system 106 can generate and/or organize one or more glyph databases using a variety of implementations. For example, the digital typography detection system 106 can generate and/or organize a glyph database for all fonts (e.g., as a global hash table), on a font level (e.g., as a local hash table), or on a font family level (e.g., as a regional hash table). For example, FIGS. 8A, 8B, and 8C illustrate the digital typography detection system 106 organizing one or more glyph databases for all fonts, on a font level, and on a font family level.

For instance, FIG. 8A illustrates the digital typography detection system 106 generating and/or organizing a glyph database for all fonts (e.g., as a global hash). Indeed, as shown in FIG. 8A, the digital typography detection system 106 includes hash keys, font IDs, glyph IDs (e.g., GIDs), and path descriptors for candidate glyphs within a glyph database (e.g., a cache file). Indeed, the digital typography detection system 106 can include font IDs, hash keys, glyph IDs, and/or path descriptors for any number of fonts within a glyph database (as a global hash). In some embodiments, the digital typography detection system 106 can generate and/or organize a glyph database (as a global hash) by including glyph IDs, font IDs, and hash keys for one or more candidate glyphs and then can fetch path descriptor and/or vector outline information using the glyph IDs and font IDs (as described above).

Furthermore, FIG. 8B illustrates the digital typography detection system 106 generating and/or organizing multiple glyph databases on font levels (e.g., as a local hash). In particular, as shown in FIG. 8B, the digital typography detection system 106 includes a hash key, a glyph ID, and a path descriptor in separate glyph databases (e.g., separate file caches) for each separate font (e.g., font 1, font 2, through font 4). In one or more embodiments, the digital typography detection system 106 utilizes a continuous and unique glyph ID through the one or more glyph databases corresponding to the separate fonts. Furthermore, the digital typography detection system 106 can generate and/or organize one or more glyph databases corresponding to separate fonts (as local hashes) by including hash keys and glyph IDs for one or more candidate glyphs and then can fetch path descriptor and/or vector outline information using the glyph IDs.

Moreover, FIG. 8C illustrates the digital typography detection system 106 generating and/or organizing multiple glyph databases on a font family level (e.g., as a regional hash). For instance, as shown in FIG. 8C, the digital typography detection system 106 includes hash keys, glyph IDs, font IDs, and path descriptors for one or more fonts in a glyph database (e.g., a cache file) corresponding to a first family of fonts. Moreover, as illustrated in FIG. 8C, the digital typography detection system 106 includes another set of hash keys, glyph IDs, font IDs, and path descriptors for one or more fonts in a glyph database corresponding to a second family of fonts. Furthermore, the digital typography detection system 106 can generate and/or organize one or more glyph databases corresponding to separate font families (as regional hashes) by including hash keys, font IDs, and glyph IDs for one or more glyphs and then can fetch path descriptor and/or vector outline information using the glyph IDs. In one or more embodiments, the digital typography detection system 106 can include a hash key that is the same for multiple glyph IDs across a set of fonts belonging to one family. Indeed, in some embodiments, the digital typography detection system 106 can utilize a hash key that is the same for multiple glyph IDs even when path descriptors are different (e.g., by fetching path descriptors separately based on font ID and glyph ID) in order to reduce an amount of memory utilized by the glyph database.

Moreover, the digital typography detection system 106 can generate and/or utilize any glyph database described above as a static glyph database. In particular, the digital typography detection system 106 can utilize offsets of various information (e.g., an offset of path descriptor information for a glyph ID) within a glyph database to efficiently read path descriptor and/or glyph ID information for any font within the glyph database because, in one or more embodiments, the path descriptor, font, and/or glyph information within the glyph database is fixed and does not change after the digital typography detection system 106 generates the glyph database. Although FIGS. 8A, 8B, and 8C include path descriptor information, as mentioned above, the digital typography detection system 106 can generate one or more glyph databases without including path descriptor information and can fetch information (e.g., path descriptors and/or vector outlines) on demand using glyph IDs and/or font IDs.

Furthermore, in some embodiments, the digital typography detection system 106 can generate one or more glyph databases with a limited number of characters (e.g., 62 English characters). By limiting the number of characters, the digital typography detection system 106 can further reduce the size of a glyph database (and can also operate without having to install the fonts on a user device). Furthermore, in some embodiments, the digital typography detection system 106 stores different Unicode ranges for fonts with different scripts in a glyph database.

Additionally, the digital typography detection system 106 can also pre-process a glyph database (e.g., using a set of commonly utilized fonts) along with binary code for the glyph database (e.g., a binary translation of the glyph database). By doing so, the digital typography detection system 106 can reduce initialization time in an application that utilizes (or implements) the digital typography detection system 106. By including a pre-processed glyph database, the digital typography detection system 106 can initialize detection of a typography element without having to process data to create a glyph database (e.g., without having to generate hash keys, path descriptors, etc.) while operating on a client application.

Moreover, by utilizing hash-based querying and/or path-descriptor matching with a glyph database, the digital typography detection system 106 can perform one or more acts described above in parallel (e.g., at or near the same time on one or more processors). In particular, the digital typography detection system 106 can generate hash keys and select a set of candidate glyphs using hash keys in parallel for multiple vector outlines (e.g., for multiple glyphs portrayed in one or more digital files). Indeed, the digital typography detection system 106 can efficiently and quickly determine typography elements for multiple vector outlines in parallel due to efficiencies resulting from generating hash keys that utilize a small amount of memory and searching in a glyph database that is also memory efficient. Furthermore, the digital typography detection system 106 can also process multiple path-descriptor matches (in accordance with one or more embodiments herein) for a single vector outline in parallel (e.g., due to the size of path descriptors).

As mentioned above, the digital typography detection system 106 can detect one or more typography elements from vector outlines that include released paths. In particular, in one or more embodiments, the digital typography detection system 106 can utilize a combination of hash-based querying, path-descriptor matching, and clustering techniques (e.g., variational clustering) to determine path groupings from released paths in a vector outline (e.g., two or more paths are not grouped together and/or do not comprise an association with each other). Indeed, the digital typography detection system 106 can utilize hash-based querying to determine an initial path to utilize as an initial seed for clustering one or more released paths of a vector outline.

For instance, in one or more embodiments, the digital typography detection system 106 determines (or selects) one or more paths (e.g., as clustering-candidate paths) from the released paths of a vector outline using one or more techniques described above (e.g., ordering based on surface area comparison, vector outline attributes, and/or using a top-left path in an ordered set of paths in accordance with one or more embodiments herein). Then, the digital typography detection system 106 generates point-order-agnostic hash keys for the selected one or more paths (e.g., rather than for a vector outline consisting of a group of paths) in accordance with one or more embodiments herein. Indeed, the digital typography detection system 106 can utilize a glyph database that includes hash keys for primary paths of one or more glyphs (e.g., generated as described above) to select candidate glyphs that correspond to the selected one or more paths from the released paths of the vector outline based on the generated point-order-agnostic hash keys in accordance with one or more embodiments herein. Indeed, the digital typography detection system 106 can utilize the selected one or more paths as one or more initial seeds for clustering released paths in a vector outline.

In some embodiments, upon selecting candidate glyphs for the one or more selected paths from the released paths, the digital typography detection system 106 can further filter the selected paths using path descriptors to determine initial seeds for clustering. In particular, the digital typography detection system 106 can determine path descriptors for the one or more selected paths (in accordance with one or more embodiments herein) and match the path descriptors to path descriptors corresponding to the selected candidate glyphs (e.g., as described above). Then, the digital typography detection system 106 can filter the selected one or more paths from the released paths based on path-descriptor matching as described above. Indeed, the digital typography detection system 106 can utilize the filtered paths from the selected one or more paths as one or more initial seeds for clustering released paths in a vector outline.

For instance, the digital typography detection system 106 can utilize the one or more selected paths (and/or further filtered paths using path descriptors) as initial seeds for a clustering algorithm (e.g., to cluster released paths from the vector outline into groups that are likely to correspond to a glyph). In particular, the digital typography detection system 106 can utilize clustering algorithms such as, but not limited to, variational clustering algorithms or agglomerative clustering techniques. Indeed, the digital typography detection system 106 utilizes clustering algorithms with the selected paths as initial seeds to determine a group of released paths that form a glyph in a vector outline. By utilizing hash-based querying and/or path-descriptor matching to determine paths as initial seeds for clustering, the digital typography detection system 106 can enable clustering algorithms to converge towards more accurate clusters of paths. Then, the digital typography detection system 106 can utilize the grouped paths (in the vector outline) to detect typography elements in accordance with one or more embodiments herein.

As mentioned above, the digital typography detection system 106 can improve memory consumption in comparison with conventional systems. Indeed, experimenters utilized 7,000 fonts (out of which 6,500 were non-CJK fonts and approximately 500 were CJK fonts) to generate a glyph database using all fonts (e.g., a global hash) in accordance with one or more embodiments herein. The experimental glyph database resulted in a total number of 2.3 million glyphs with 59,506 unique hash keys (e.g., buckets in hash). Indeed, the experimental glyph database resulted in a distribution of hash keys with approximately 13 hash keys that corresponded with greater than 10,000 glyphs, 26 hash keys that corresponded with greater than 5,000 glyphs, 467 hash keys that corresponded with greater than 1,000 glyphs, 2,996 hash keys that corresponded with greater than 100 glyphs, and 15,015 hash keys that corresponded with greater than 50 glyphs. Moreover, the experimental glyph database resulted in a memory requirement of five to six megabytes for in memory hashing (e.g., 4.6 MB in glyphs and 512 KB in hash keys). Furthermore, the experimental glyph database can be utilized by the digital typography detection system 106 with a total memory cache size of 132 MB.

Additionally, experimenters also utilized the digital typography detection system 106 to detect typography elements from CJK (e.g., Chinese, Japanese, and Korean) glyphs and from stylistic glyphs. The stylistic glyphs utilized the same Unicode, but contained different glyphs. In the experimental results, the digital typography detection system 106 was able to accurately detect glyph, font, and transformation information for both CJK glyphs and for stylistic glyphs.

Figure 9:
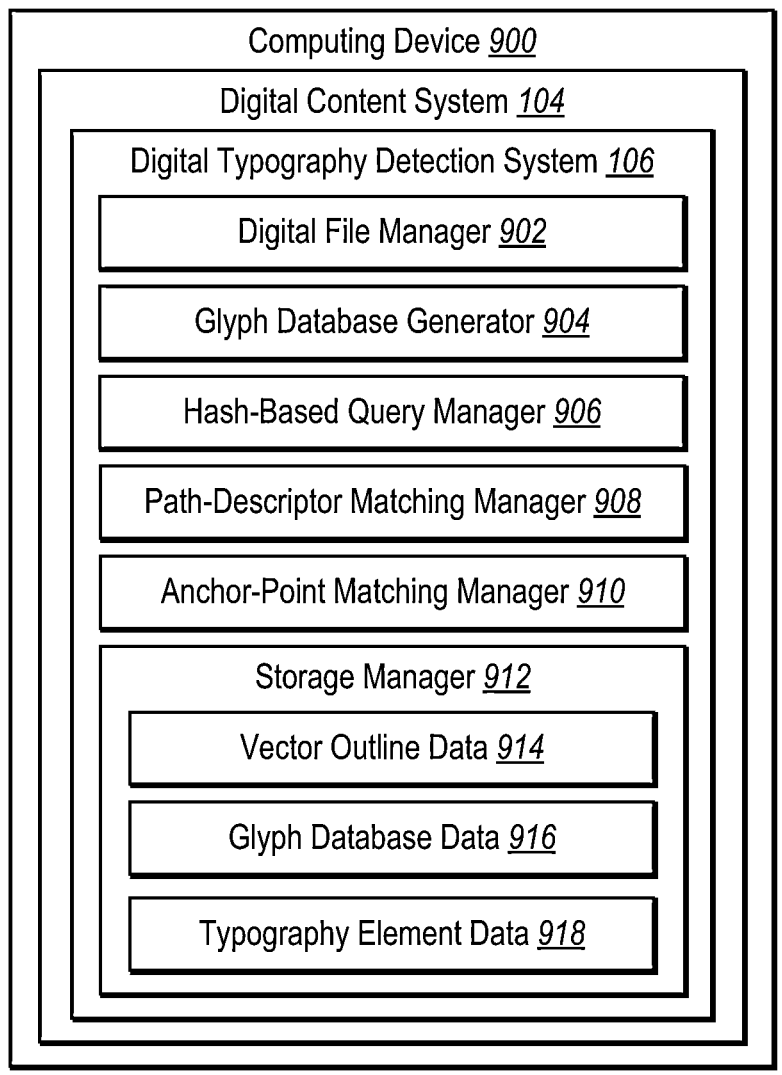
FIG. 9 illustrates an example architecture of a digital typography detection system in accordance with one or more embodiments.

Turning now to FIG. 9, additional detail will be provided regarding components and capabilities of one or more embodiments of the digital typography detection system. In particular, FIG. 9 illustrates an embodiment of an example digital typography detection system 106 executed by a computing device 900 (e.g., the server device(s) 102 and/or the client device 110). As shown by the embodiment in FIG. 9, the computing device 900 can include or host the digital content system 104 and the digital typography detection system 106. The digital typography detection system 106 can include a digital file manager 902, a glyph database generator 904, a hash-based query manager 906, a path-descriptor matching manager 908, an anchor-point matching manager 910, and a storage manager 912 which can include vector outline data 914, glyph database data 916, and typography element data 918.

As just mentioned, and as illustrated in the embodiment in FIG. 9, the digital typography detection system 106 can include the digital file manager 902. For example, the digital file manager 902 can utilize one or more digital files to determine (or identify) vector outlines portraying glyphs as described above (e.g., in relation to FIGS. 2 and 3). Furthermore, the digital file manager 902 can provide vector outlines for typography element detection as described above (e.g., in relation to FIGS. 2 and 3).

Additionally, as shown in FIG. 9, the digital typography detection system 106 can include the glyph database generator 904. For instance, the glyph database generator 904 can generate a glyph database which includes at least one of glyph IDs, font IDs, point-order-agnostic hash keys, path descriptors, and/or vector outlines for one or more glyphs as described above (e.g., in relation to FIGS. 4, 5A, 5B, 5C, 6, 7, 8A, 8B, and 8C). In particular, the glyph database generator 904 can generate at least one of glyph IDs, font IDs, point-order-agnostic hash keys, path descriptors, and/or vector outlines for one or more glyphs and include such information in one or more glyph databases that are accessible to perform a hash-based query, path-descriptor matching, and/or anchor-point matching as described above (e.g., in relation to FIGS. 4, 5A, 5B, 5C, 6, 7, 8A, 8B, and 8C).

In addition, as shown in FIG. 9, the digital typography detection system 106 can include the hash-based query manager 906. For example, the hash-based query manager 906 can determine a point-order-agnostic hash key for a vector outline as described above (e.g., in relation to FIG. 3). Moreover, the hash-based query manager 906 can utilize a hash key generated for a vector outline to select (or identify) a set of candidate glyphs from one or more glyph databases as described above (e.g., in relation to FIG. 4).

Moreover, as illustrated in FIG. 9, the digital typography detection system 106 can include the path-descriptor matching manager 908. For instance, the path-descriptor matching manager 908 can determine a path from a vector outline to utilize for path-descriptor matching and determine a path descriptor from the path as described above (e.g., in relation to FIGS. 5A, 5B, and 5C). Furthermore, the path-descriptor matching manager 908 can utilize a path descriptor for a vector outline to select one or more candidate glyphs from a glyph database (e.g., a subset of candidate glyphs) by matching path descriptors using a transformation analysis as described above (e.g., in relation to FIG. 6).

Additionally, as shown in FIG. 9, the digital typography detection system 106 can include the anchor-point matching manager 910. For example, the anchor-point matching manager 910 can determine (or fetch) anchor points for one or more candidate glyphs and for a vector outline as described above (e.g., in relation to FIG. 7). Moreover, the anchor-point matching manager 910 can select a glyph that matches a vector outline from one or more candidate glyphs (e.g., from the subset of candidate glyphs) by matching the anchor points of the candidate glyphs and the vector outline using a transformation analysis as described above (e.g., in relation to FIG. 7). In addition, the anchor-point matching manager 910 can identify (or detect) one or more typography elements (e.g., glyph, font, and transformation information) for the vector outline by selecting such typography elements from the selected glyph and from transformation matrices determined during a transformation analysis as described above (e.g., in relation to FIGS. 6 and 7).

Furthermore, as illustrated in FIG. 9, the digital typography detection system 106 can include the storage manager 912. In some embodiments, the storage manager 912 can be implemented by one or more memory devices. The storage manager 912 can maintain data to perform one or more functions of the digital typography detection system 106. As shown in FIG. 9, the storage manager 912 can include the vector outline data 914 (e.g., digital files having vector outline content, vector outlines of glyphs in one or more glyph databases, anchor point data for vector outlines, point-order-agnostic hash keys for a vector outline, path descriptors for a vector outline, anchor point data for vector outlines of glyphs in one or more glyph databases), the glyph database data 916 (e.g., glyph information, glyph IDs, font IDs, point-order-agnostic hash keys, path descriptors, vector outlines for one or more glyphs), and the typography element data 918 (e.g., glyph information for a vector outline and/or for glyphs in a glyph database, font information for the vector outline and/or for glyphs in the glyph database, and transformation information corresponding to the vector outline in relation to glyphs in the glyph database).

Each of the components 902-918 of the computing device 900 (e.g., the computing device 900 implementing the digital typography detection system 106), as shown in FIG. 9, may be in communication with one another using any suitable communication technologies. It will be recognized that although components 902-918 of the computing device 900 (or computer device) are shown to be separate in FIG. 9, any of components 902-918 may be combined into fewer components, such as into a single facility or module, divided into more components, or configured into different components as may serve a particular embodiment.

The components 902-918 of the computing device 900 can comprise software, hardware, or both. For example, the components 902-918 can comprise one or more instructions stored on a computer-readable storage medium and executable by processors of one or more computing devices. When executed by the one or more processors, the computer-executable instructions of the digital typography detection system 106 (e.g., via the computing device 900) can cause a client device and/or a server device to perform the methods described herein. Alternatively, the components 902-918 and their corresponding elements can comprise hardware, such as a special purpose processing device to perform a certain function or group of functions. Additionally, the components 902-918 can comprise a combination of computer-executable instructions and hardware.

Furthermore, the components 902-918 of the digital typography detection system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-918 may be implemented as a stand-alone application, such as a desktop or mobile application. Furthermore, the components 902-918 may be implemented as one or more web-based applications hosted on a remote server. The components 902-918 may also be implemented in a suite of mobile device applications or "apps." To illustrate, the components 902-918 may be implemented in an application, including but not limited to, ADOBE SENSEI, ADOBE ILLUSTRATOR, ADOBE ACROBAT READER, ADOBE PRINT, and ADOBE PHOTOSHOP. "ADOBE," "ADOBE SENSEI," "ADOBE ILLUSTRATOR," "ADOBE ACROBAT READER," "ADOBE PRINT," and "ADOBE PHOTOSHOP." are either registered trademarks or trademarks of Adobe Inc. in the United States and/or other countries.

Figure 10:
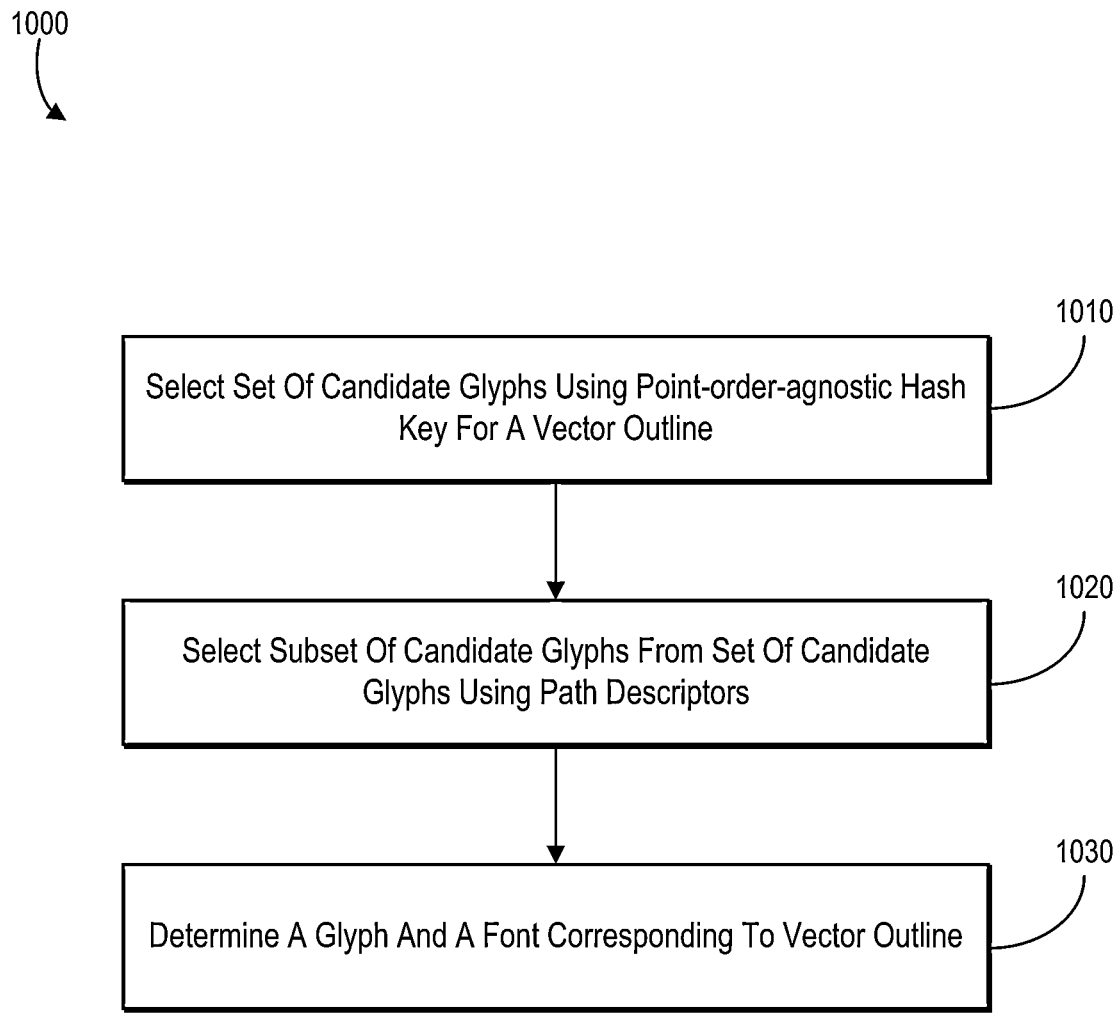
FIG. 10 illustrates a flowchart of a series of acts for detecting typography elements from vector outlines in accordance with one or more embodiments.

FIGS. 1-9, the corresponding text, and the examples provide a number of different methods, systems, devices, and non-transitory computer-readable media of the digital typography detection system 106. In addition to the foregoing, one or more embodiments can also be described in terms of flowcharts comprising acts for accomplishing a particular result, as shown in FIG. 10. FIG. 10 may be performed with more or fewer acts. Further, the acts may be performed in differing orders. Additionally, the acts described herein may be repeated or performed in parallel with one another or parallel with different instances of the same or similar acts.

As mentioned above, FIG. 10 illustrates a flowchart of a series of acts 1000 for detecting typography elements from vector outlines in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a method. Alternatively, a non-transitory computer-readable medium can comprise instructions that, when executed by one or more processors, cause a computing device to perform the acts of FIG. 10. In some embodiments, a system can perform the acts of FIG. 10.

As illustrated in FIG. 10, the series of acts 1000 include an act 1010 of selecting a set of candidate glyphs using a point-order-agnostic hash key for a vector outline. In particular, the act 1010 can include identifying a vector outline for a character within a digital file. Moreover, the act 1010 can include selecting a set of candidate glyphs for a vector outline using a point-order-agnostic hash key for the vector outline. In addition, the act 1010 can include generating a point-order-agnostic hash key for a vector outline. For instance, a point-order-agnostic hash key, for a vector outline, can include at least one of a number of paths, a number of lines, or a number of curves corresponding to the vector outline. Furthermore, the act 1010 can include generating a point-order-agnostic hash key, for a vector outline, by concatenating at least a number of paths, a number of lines, and a number of curves corresponding to the vector outline.

Additionally, the act 1010 can include selecting a set of candidate glyphs using a point-order-agnostic hash key for a vector outline by comparing the point-order-agnostic hash key to one or more hash keys from glyphs within a glyph database (e.g., one or more point-order-agnostic hash keys from the glyph database). Moreover, the act 1010 can include generating a glyph database. For example, a glyph database can include one or more glyph identifiers (IDs), one or more font IDs, and one or more point-order-agnostic hash keys for candidate glyphs. Moreover, as an example, a glyph database can include typography elements. In addition, the act 1010 can include selecting, for a vector outline within a digital file, a set of candidate glyphs for the vector outline by generating a point-order-agnostic hash key for the vector outline (e.g., the point-order-agnostic hash key include at least one of a number of paths or a number of lines corresponding to the vector outline) and comparing the point-order-agnostic hash key to one or more hash keys from candidate glyphs within a glyph database.

Furthermore, a vector outline can include two or more paths that are not grouped together. Moreover, the act 1010 can include selecting a clustering-candidate path from two or more paths (of a vector outline) by comparing hash keys and path descriptors corresponding to the clustering-candidate path and initial candidate glyphs. Additionally, the act 1010 can include utilizing a clustering-candidate path as an initial seed to cluster two or more paths (of a vector outline) prior to generating a point-order-agnostic hash key for the vector outline.

In addition to (or in alternative to) the acts above, the digital typography detection system 106 can also perform a step for identifying a set of candidate glyphs for a vector outline. For instance, the acts and algorithms described above in relation to FIGS. 3 and 4 (e.g., the acts 302-306 and the acts 402-406) can comprise the corresponding acts and algorithms for performing a step for identifying a set of candidate glyphs for a vector outline.

As illustrated in FIG. 10, the series of acts 1000 include an act 1020 of selecting a subset of candidate glyphs from a set of candidate glyphs using path descriptors. In particular, the act 1020 can include selecting a subset of candidate glyphs from a set of candidate glyphs based on a path descriptor corresponding to a path from a vector outline and path descriptors corresponding to paths from the set of candidate glyphs. Moreover, the act 1020 can include selecting a subset of candidate glyphs by selecting the subset of candidate glyphs corresponding to a candidate font which includes more corresponding candidate glyphs than other candidate fonts.

In addition, the act 1020 can include selecting a subset of candidate glyphs from a set of candidate glyphs (e.g., corresponding to at least one candidate font) by comparing a path descriptor corresponding to the vector outline (or a path from the vector outline) to path descriptors corresponding to the set of candidate glyphs (or paths from the set of candidate glyphs) using an affine-transformation analysis. Furthermore, the act 1020 can include comparing a path descriptor corresponding to a path from a vector outline to path descriptors corresponding to paths from a set of candidate glyphs by determining a transformation matrix between a path descriptor from a candidate glyph from the set of candidate glyphs and the path descriptor from the vector outline, transforming the path descriptor from the vector outline using the transformation matrix, comparing the transformed path descriptor from the vector outline to the path descriptor from the candidate glyph, and selecting the candidate glyph for the subset of candidate glyphs based on a comparison of the transformed path descriptor from the vector outline to the path descriptor from the candidate glyph.

Additionally, the act 1020 can include identifying a path from one or more paths corresponding to a vector outline by determining surface areas for the one or more paths. Additionally, the act 1020 can include determining a path descriptor for a path as a path-order-agnostic path descriptor by selecting a threshold number of equally spaced anchor points from the path as a subset of anchor points from a set of anchor points for a vector outline.

In addition to (or in alternative to) the acts above, the digital typography detection system 106 can also perform a step for identifying a subset of candidate glyphs from a set of candidate glyphs for a vector outline. For instance, the acts and algorithms described above in relation to FIGS. 5A, 5B, 5C and 6 (e.g., the acts 502, 504, 508, 516, 520 and the acts 602-612) can comprise the corresponding acts and algorithms for performing a step for identifying a subset of candidate glyphs from a set of candidate glyphs for a vector outline.

As illustrated in FIG. 10, the series of acts 1000 include an act 1030 of determining a glyph and a font corresponding to a vector outline. In particular, the act 1030 can include, based on a set of anchor points for the vector outline and sets of anchor points corresponding the subset of candidate glyphs, determining, from among a subset of candidate glyphs, a glyph and a font that correspond to a vector outline. Furthermore, the act 1030 can include determining a glyph corresponds to a vector outline by matching a set of anchor points for the vector outline to a set of anchor points for the glyph from a subset of candidate glyphs. Moreover, the act 1030 can include determining, from among a subset of candidate glyphs, a glyph and a font that correspond to a vector outline by comparing a set of anchor points for the vector outline to sets of anchor points corresponding the subset of candidate glyphs.

Furthermore, the act 1030 can include determining a transformation from a vector outline to a glyph. In addition, the act 1030 can include detecting a request (from a client device) to identify a typography element for a vector outline within a digital file. Moreover, the act 1030 can include providing a glyph and a font corresponding to a vector outline to a client device in response to a request (to identify a typography element for a vector outline within a digital file).

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
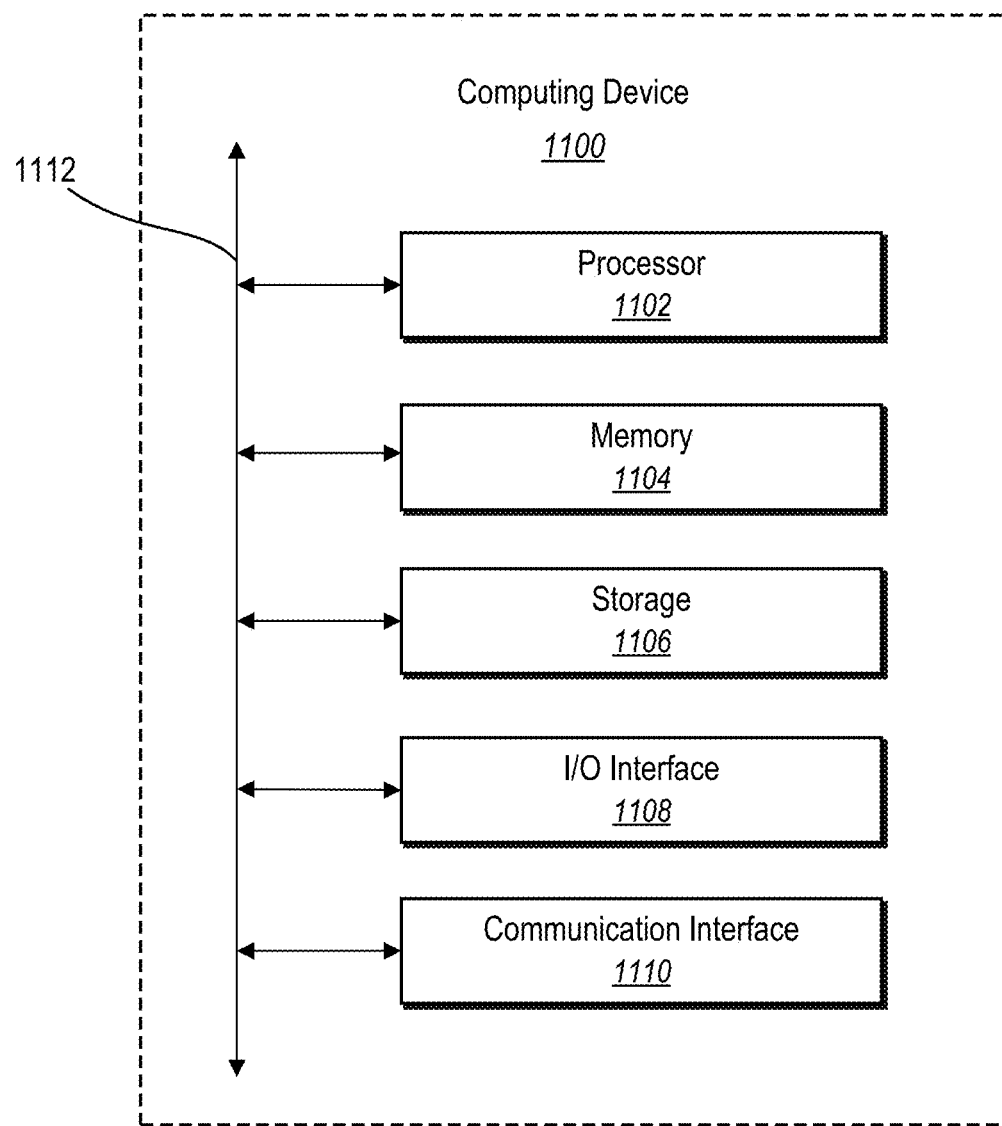
FIG. 11 illustrates a block diagram of an example computing device in accordance with one or more embodiments.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 900, server device(s) 102, and client device 110). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments.

Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive ("HDD"), flash memory, a Universal Serial Bus ("USB") drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller ("NIC") or network adapter for communicating with an Ethernet or other wire-based network or a wireless NIC ("WNIC") or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by a processing device, cause the processing device to perform operations comprising:
    selecting a set of candidate glyphs for a vector outline corresponding to a character utilizing a hash key determined from a quantity of attributes corresponding to the vector outline;
    selecting a subset of candidate glyphs from the set of candidate glyphs based on a path descriptor corresponding to a path from the vector outline and path descriptors corresponding to paths from the set of candidate glyphs; and
    based on a set of anchor points for the vector outline and sets of anchor points corresponding to the subset of candidate glyphs, determining, from among the subset of candidate glyphs, a glyph and a font that correspond to the vector outline.

2. The non-transitory computer-readable medium of claim 1, wherein the hash key comprises a numerical value based on a combination of a number of paths, a number of lines, or a number of curves corresponding to the vector outline.

3. The non-transitory computer-readable medium of claim 1, wherein the operations further comprise identifying the vector outline corresponding to the character from a digital file depicting one or more characters, the digital file comprising a digital image file or a portable document format (PDF) file.

4. The non-transitory computer-readable medium of claim 1, wherein the operations further comprise displaying the determined glyph and the determined font in relation to the vector outline.

5. The non-transitory computer-readable medium of claim 1, wherein the operations further comprise utilizing the determined glyph and the determined font to enable modification of the vector outline.

6. The non-transitory computer-readable medium of claim 1, wherein the operations further comprise utilizing the determined glyph and the determined font to extract the vector outline into a digital file.

7. The non-transitory computer-readable medium of claim 1, wherein the operations further comprise modifying a graphical object utilizing the determined glyph and the determined font from the vector outline.

8. The non-transitory computer-readable medium of claim 1, wherein the operations further comprise identifying the path from one or more paths corresponding to the vector outline by determining that the path comprises greater surface area than other paths from the one or more paths.

9. The non-transitory computer-readable medium of claim 1, wherein the operations further comprise identifying the set of candidate glyphs from a glyph database comprising one or more glyph identities (IDs), one or more font IDs, and one or more hash keys for candidate glyphs by comparing the one or more hash keys to the hash key corresponding to the vector outline.

10. A system comprising:
    a memory component comprising a glyph database comprising typography elements; and
    one or more processors coupled to the memory component, the one or more processors to perform operations comprising:

selecting a set of candidate glyphs from the glyph database for a vector outline corresponding to a character utilizing a hash key determined from a quantity of attributes corresponding to the vector outline;

selecting, from the set of candidate glyphs, a subset of candidate glyphs corresponding to at least one candidate font by comparing a path descriptor corresponding to a path from the vector outline to path descriptors corresponding to paths from the set of candidate glyphs; and determining, from among the subset of candidate glyphs, a glyph and a font that correspond to the vector outline by comparing a set of anchor points for the vector outline to sets of anchor points corresponding to the subset of candidate glyphs.

11. The system of claim 10, wherein the operations further comprise generating the hash key for the vector outline utilizing a numerical value based on the quantity of attributes corresponding to the vector outline.

12. The system of claim 10, wherein the operations further comprise utilizing the determined glyph and the determined font to enable modification of the vector outline within a digital file.

13. The system of claim 10, wherein the operations further comprise modifying an additional vector outline utilizing the determined glyph and the determined font from the vector outline.

14. The system of claim 10, wherein the glyph database comprises one or more glyph identities (IDs), one or more font IDs, and data indicators for a number of paths, a number of lines, and a number of curves corresponding to the set of candidate glyphs.

15. The system of claim 10, wherein the operations further comprise selecting the subset of candidate glyphs by comparing the hash key of the vector outline to hash keys corresponding to the set of candidate glyphs.

16. A computer-implemented method comprising:

selecting a set of candidate glyphs for a vector outline corresponding to a character utilizing a hash key determined from a quantity of attributes corresponding to the vector outline;

selecting a subset of candidate glyphs from the set of candidate glyphs based on a path descriptor corresponding to a path from the vector outline and path descriptors corresponding to paths from the set of candidate glyphs; and based on a set of anchor points for the vector outline and sets of anchor points corresponding to the subset of candidate glyphs, determining, from among the subset of candidate glyphs, a glyph and a font that corresponds to the vector outline.

17. The computer-implemented method of claim 16, further comprising:

detecting a request, from a client device, to identify a typography element for the vector outline within a digital file; and providing for display, as the typography element, the determined glyph and the determined font that corresponds to the vector outline within the client device in response to the request.

18. The computer-implemented method of claim 16, further comprising utilizing the determined glyph and the determined font to enable modification of the vector outline within a digital file.

19. The computer-implemented method of claim 16, further comprising modifying a graphical object utilizing the determined glyph and the determined font from the vector outline.

20. The computer-implemented method of claim 16, further comprising:

identifying the path from one or more paths corresponding to the vector outline by determining that the path comprises greater surface area than other paths from the one or more paths; and determining that the glyph corresponds to the vector outline by matching the set of anchor points for the vector outline to a set of anchor points for the glyph from the subset of candidate glyphs.

* * * * *